United States Patent
Kushner et al.

(10) Patent No.: US 11,170,279 B1
(45) Date of Patent: Nov. 9, 2021

(54) WOOD TRANSACTION INSTRUMENT

(71) Applicant: Wells Fargo Bank, N.A., San Francisco, CA (US)

(72) Inventors: Kristine Ing Kushner, Orinda, CA (US); John T. Wright, Benicia, CA (US); Paul Vittimberga, Charlotte, NC (US); Marina M. Chin, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/708,038

(22) Filed: Dec. 9, 2019

Related U.S. Application Data

(62) Division of application No. 16/045,445, filed on Jul. 25, 2018, now Pat. No. 10,572,784.

(51) Int. Cl.
| | |
|---|---|
| *G06K 19/06* | (2006.01) |
| *B27M 1/02* | (2006.01) |
| *G06Q 20/34* | (2012.01) |
| *B27K 5/04* | (2006.01) |
| *B27K 5/06* | (2006.01) |
| *G06Q 20/40* | (2012.01) |

(52) U.S. Cl.
CPC .......... *G06K 19/06046* (2013.01); *B27K 5/04* (2013.01); *B27K 5/06* (2013.01); *B27M 1/02* (2013.01); *G06Q 20/341* (2013.01); *G06Q 20/4012* (2013.01)

(58) Field of Classification Search
CPC ......... G06K 19/06046; G06Q 20/4012; G06Q 20/341; B27M 1/02; B27K 5/04; B27K 5/06
See application file for complete search history.

(56) References Cited

U.S. PATENT DOCUMENTS

| | | |
|---|---|---|
| 4,303,852 A | 12/1981 | Silverman et al. |
| 7,221,258 B2 | 5/2007 | Lane et al. |
| 7,404,422 B2 | 7/2008 | Kamke et al. |
| 7,429,062 B2 | 9/2008 | Fan et al. |

(Continued)

FOREIGN PATENT DOCUMENTS

| | | |
|---|---|---|
| CN | 103659946 A | 3/2014 |
| CN | 103331789 B | 8/2015 |
| EP | 2048867 A1 | 4/2009 |
| JP | 2013097542 A | 5/2013 |

(Continued)

OTHER PUBLICATIONS

"Micro-Thin Wood Veneer Sheets," Cards of Wood, accessed from https://www.cardsofwood.com/ on or about Apr. 4, 2018, 1 pp.

(Continued)

*Primary Examiner* — Matthew Mikels
(74) *Attorney, Agent, or Firm* — Shumaker & Sieffert, P.A.

(57) ABSTRACT

In some examples, a method of manufacturing a densified wood transaction instrument includes boiling a sheet of wood in a chemical solution, compressing the boiled sheet of wood using a die in a press to form one or more features in the sheet of wood, during the compressing of the boiled sheet of wood, heating the boiled sheet of wood to create a sheet of densified wood, and attaching one or more payment elements to at least one of the one or more features formed in the sheet of densified wood to form a sheet of one or more densified wood transaction instruments.

20 Claims, 18 Drawing Sheets

(56) References Cited

U.S. PATENT DOCUMENTS

| | | | |
|---|---|---|---|
| 7,770,013 B2 | 8/2010 | Rhoads et al. | |
| 9,844,922 B2 | 12/2017 | Ricketts et al. | |
| 10,572,784 B1 | 2/2020 | Kushner et al. | |
| 2009/0208766 A1* | 8/2009 | Suzuki | B27M 1/02 428/537.1 |
| 2011/0168781 A1* | 7/2011 | Akesson | B32B 5/26 235/492 |
| 2011/0311787 A1 | 12/2011 | Akesson | |
| 2013/0287267 A1 | 10/2013 | Varone | |
| 2015/0069132 A1* | 3/2015 | Pueschner | H01L 23/49855 235/488 |
| 2015/0189238 A1 | 7/2015 | Ishiyama et al. | |
| 2016/0300107 A1 | 10/2016 | Callegari et al. | |
| 2017/0109622 A1 | 4/2017 | Cepress et al. | |

FOREIGN PATENT DOCUMENTS

| | | |
|---|---|---|
| WO | 2016108637 A1 | 7/2016 |
| WO | 2018046123 A1 | 3/2018 |

OTHER PUBLICATIONS

Parmar et al., "Generation of Secure One-Time Password Based on Image Authentication," Computer Science & Information Technology, Oct. 19, 2012, 12 pp.

Perkins, "Stronger Than Steel, Able to Stop a Speeding Bullet—It's Super Wood," Chemistry, accessed from https://www.scientificamerican.com/article/stronger-than-steel-able-to-stop-a-speeding-bullet-mdash-it-rsquo-s-super-wood/, Feb. 7, 2018, 8 pp.

Tataru, "Secure Image Verification in Jointed Frequency Domains," International Journal of Computer Science and Applications, vol. 12, No. 2, Aug. 2015, 21 pp.

Van Mensvoort, "Wooden Bankcard," Biomimicmarketing, Jul. 23, 2009, 3 pp.

"Wooden Business Cards," Jukebox Online, accessed from https://www.jukeboxprint.com/wooden-business-cards, accessed on or about Apr. 4, 2018, 2 pp.

Prosecution History from U.S. Appl. No. 16/045,445, dated Mar. 6, 2019 through Oct. 21, 2019, 35 pp.

\* cited by examiner

WOOD TRANSACTION INSTRUMENT

This application is a division of U.S. application Ser. No. 16/045,445, filed Jul. 25, 2018, the entire contents of which is incorporated herein by reference.

TECHNICAL FIELD

The present disclosure relates to transaction instruments.

BACKGROUND

Transaction instruments, such as credit cards and debit cards, have long provided users with a convenient payment option at a majority of merchants. Transaction instruments include unique information that links the card to a user's account with a financial institution (e.g., a bank or a non-bank card issuer). For example, in the case of a traditional credit card, the account may comprise an amount of credit available to the user, or in the case of a debit card, the account may comprise a checking or savings account that belongs to the user. Transaction instruments typically include the user's name, the account number, an expiration date, and a card security code (CSC) (alternatively referred to as a card verification value (CVV) or card verification code (CVC)) printed or embossed on the physical card. In some examples, transaction instruments may further include other elements such as, for example, a company name, a customer tenure, a logo, an image, or the like.

SUMMARY

The disclosure describes articles, systems, and techniques relating to densified wood transaction instruments. The techniques described herein enable a transaction instrument to be fabricated almost entirely from wood. For example, the techniques described herein result in densified wood transaction instruments that may be resistant to cracking, chipping, warping, or the like. Moreover, the techniques described herein form one or more features in the densified wood transaction instruments during the wood densification process, which may result in an overall process that includes fewer manufacturing steps, is less expensive, is less time-consuming, or the like.

In one example, a method of manufacturing a densified wood transaction instrument includes boiling a sheet of wood in a chemical solution, compressing the boiled sheet of wood using a die in a press to form one or more features in the sheet of wood, during the compressing of the boiled sheet of wood, heating the boiled sheet of wood to create a sheet of densified wood, and attaching one or more payment elements to at least one of the one or more features formed in the sheet of densified wood to form a sheet of one or more densified wood transaction instruments.

In another example, a method of manufacturing a densified wood transaction instrument includes boiling a first sheet of wood in a chemical solution, compressing the first boiled sheet of wood using a first die in a press to form a first set of features in the first sheet of wood, where the first set of features includes at least a first antenna feature, during the compressing of the first boiled sheet of wood, heating the first boiled sheet of wood to create a first sheet of densified wood, and attaching one or more payment elements to at least one feature of the first set of features formed in the first sheet of densified wood, where the one or more payment elements includes at least an antenna element. The method further includes boiling a second sheet of wood in the chemical solution, compressing the second boiled sheet of wood using a second die in the press to form a second set of features in the second sheet of wood, where the second set of features includes at least a second antenna feature, during compressing of the second boiled sheet of wood, heating the second boiled sheet of wood to create a second sheet of densified wood, and attaching the first sheet of densified wood to the second sheet of densified wood such that the antenna element attached to the first antenna feature on the first sheet of densified wood aligns with the second antenna feature on the second sheet of densified wood to form a sheet of one or more densified wood transaction instruments.

In yet another example, a densified wood transaction instrument includes a densified wood card including one or more features defined in the densified wood card, wherein the one or more features include permanent indentations formed into the densified wood card, and one or more payment elements attached to at least one of the one or more features defined in the densified wood card. The densified wood transaction instrument is formed via a method of manufacturing including boiling a sheet of wood in a chemical solution, compressing the boiled sheet of wood using a die in a press to form the one or more features in the sheet of wood, during the compressing of the boiled sheet of wood, heating the boiled sheet of wood to create a sheet of densified wood, and attaching the one or more payment elements to the at least one of the one or more features formed in the sheet of densified wood.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes articles, systems, and techniques relating to densified wood transaction instruments. The techniques described herein enable a transaction instrument to be fabricated almost entirely from wood. For example, the techniques described herein result in densified wood transaction instruments that may be resistant to cracking, chipping, warping, or the like. In this way, the densified wood transaction instruments described herein may have a long useful life.

In addition, the techniques described herein form one or more features in the densified wood transaction instruments during the wood densification process, which may result in an overall process that includes fewer manufacturing steps, is less expensive, is less time-consuming, or the like. For instance, the one or more features are formed during the wood densification process for the attachment of one or more payment elements, such as a magnetic stripe, an integrated circuit (IC), and/or an antenna element, to the densified wood transaction instruments. Additionally, or alternatively, the techniques described herein may form features such as, for example, a customer name, an account number, an expiration date, a company name, a customer tenure, a logo, a texture feature, and/or other features. In turn, the densified wood transaction instrument may not need to be further modified, such as, for example, milled, to allow for the attachment of the one or more payment elements.

Some example wood-like transaction instruments may attempt to provide a look and/or a feel of a wooden material without providing a transaction instrument truly made of wood. For example, a transaction instrument may include a sticker, decal, or another non-wood material configured to replicate the look of wood, e.g., having an image of wood grain, on top of another material (e.g., plastic). As another example, a wood-like transaction instrument may include a relatively thin wood veneer layer on top of another material (e.g., plastic) to provide the transaction instrument with the appearance and/or texture of wood. In such examples, the stickers, decals, and/or veneers may become unadhered to the underlying material of the transaction instrument, which may decrease the useful life of the transaction instrument. Additionally, or alternatively, processes to make such wood-like transaction instruments may require additional processing steps, processing equipment, time, and expenses. In general, example wood transaction instruments manufactured using different techniques may be prone to cracking, chipping, or warping and/or may be expensive and time-consuming to manufacture.

Figure 1A:
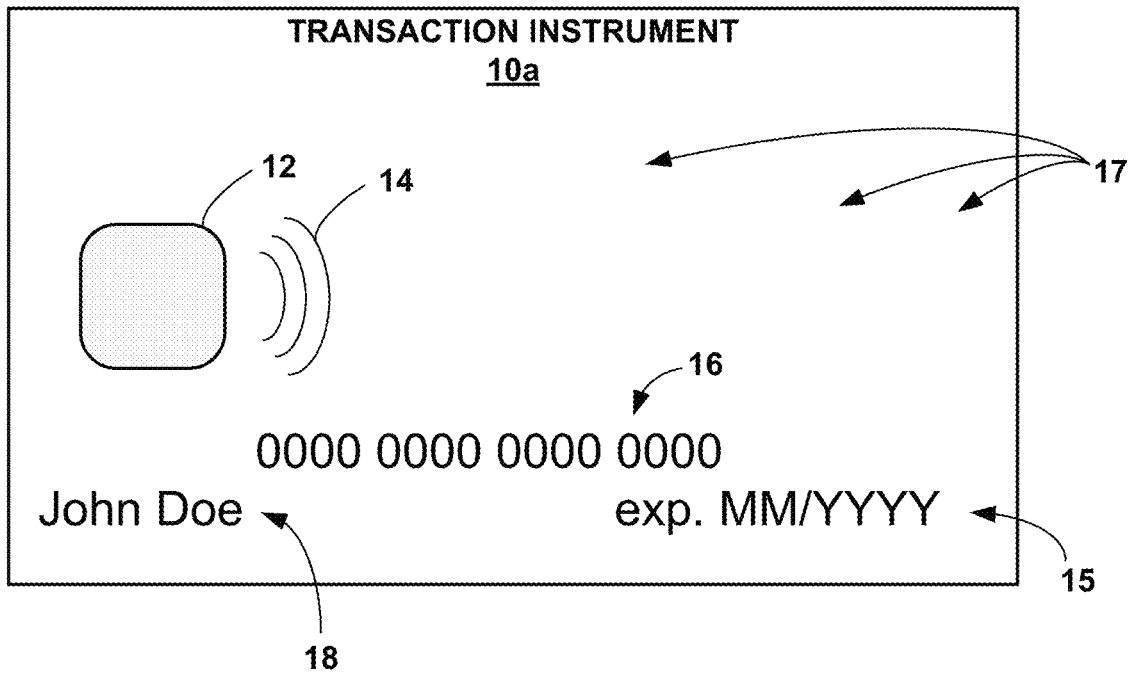
FIGS. 1A and 1B are conceptual diagrams illustrating example densified wood transaction instruments 10a and 10b, respectively, in accordance with the techniques of this disclosure.
Figure 1B:
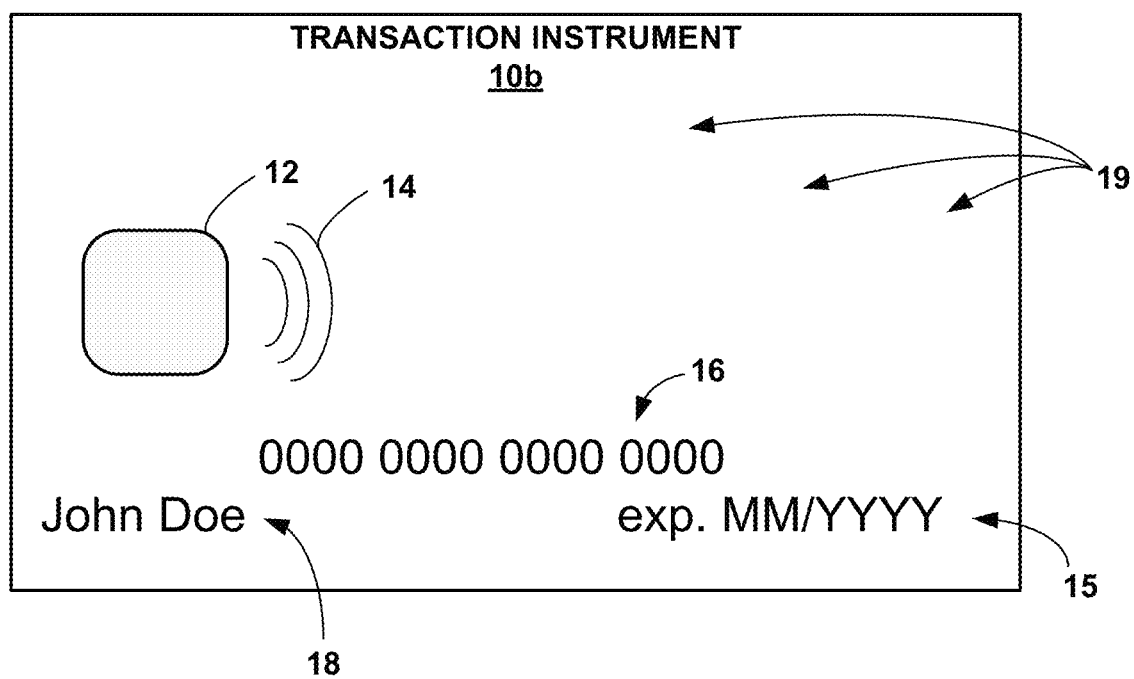

FIGS. 1A and 1B are conceptual diagrams illustrating example densified wood transaction instruments 10a and 10b, respectively, in accordance with the techniques of this disclosure. In some examples, transaction instruments 10a, 10b (collectively, "transaction instruments 10") may be credit cards or debit cards. In other examples, transaction instruments 10 may include any suitable transaction instrument. For example, transaction instruments 10 may be a ring, a fob, a watch face, or any other transaction instrument. In some examples, an end user of transaction instrument 10a, 10b may be able to customize the shape or format of transaction instrument 10a, 10b. For instance, the end user may be able to choose a specific shape or format from a selection of shapes or formats, or the user may be able to create a new shape or format that may different from a selection of shapes or formats. In some such examples, the customized shape or format may be formed via 3D printing (e.g., a customized 3D printed die for a press).

In some examples, transaction instruments 10 include integrated circuit (IC) 12. IC 12 may include a memory to store sensitive financial information of the user, authentication information, or other information related to transaction instruments 10. For example, IC 12 may include user account information linked to transaction instruments 10 for use during transactions with a merchant's point-of-sale (POS) device or another computing device. IC 12 may further include other circuitry components understood by one of ordinary skill in the art to be used to execute the techniques described herein. In some examples, IC 12 may include an Euro MasterCard Visa (EMV) chip. Though transaction instruments 10 are each depicted with one IC 12, in other examples transaction instruments 10 may each have two or more ICs.

In some examples, transaction instruments 10 include antenna element 14. In some cases, antenna element 14 may include radio frequency (RF) antennas, such that transaction instruments 10 are radio frequency identification (RFID) transaction instruments. In other examples, antenna element 14 may operate using a different short or long range communication protocol, such as near field communication (NFC), WiFi, Bluetooth®, or the like. In some examples, antenna element 14 may be coupled to IC 12. In this way, antenna element 14 may be configured to receive electromagnetic signals from a computing device and send an electromagnetic signal including the sensitive financial information of the user stored on IC 12 to a reader of the computing device by placing or "swiping" the respective transaction instrument 10a, 10b near the computing device. In this example, IC 12 may be powered by the electromagnetic signals received from the computing device via antenna element 14. In some examples, antenna element 14 may be configured to send the sensitive financial information of the user stored on IC to the computing device to perform a transaction.

In the illustrated example of FIGS. 1A and 1B, transaction instruments 10 each also include a user's name 18, an account number 16 associated with each transaction instrument 10a, 10b, and an expiration date 15. In addition, although not shown in FIGS. 1A and 1B, transaction instruments 10 may include a card security code (CSC) (alternatively referred to as a card verification value (CVV) or card verification code (CVC)) on a back side of the respective physical card. In some cases, transaction instruments 10 may each further include a magnetic stripe and a region for a user's signature on the back side of the physical card (not shown in FIGS. 1A and 1B).

Transaction instruments 10 include (i.e., are made from) densified wood in accordance with the disclosure. In some examples, transaction instruments 10 are made entirely or almost entirely of densified wood. For example, transaction instruments 10 may include one or more layers of densified wood and any payment elements, such as IC 12, antenna element 14, a magnetic stripe, or the like. In this way, transaction instruments 10 may provide a user with the look and feel of wood, without the propensity to crack, chip, or warp like non-densified wood. Moreover, because the densified wood transaction instruments 10 are made entirely or almost entirely of densified wood, users may view the transaction instruments 10 as being more authentic in comparison to a transaction instrument including a sticker, decal, non-wood material, or veneer designed to look like wood.

Transaction instruments 10 made from densified wood may each have a unique wood grain pattern 17, 19, similar to a fingerprint. In the example of FIG. 1A, transaction instrument 10a includes wood grain pattern 17, and in the example of FIG. 1B, transaction instrument 10b includes a different, unique wood grain pattern 19. In some examples, wood grain pattern 17, 19 may be the natural wood grain of the densified wood from which transaction instruments 10 are made. In other examples, wood grain pattern 17, 19 may additionally or alternatively be defined by an angle of the wood grain relative to the orientation of transaction instruments 10, a difference in wood grain on the front and back sides of transaction instruments 10, an ultraviolet ink pattern within the wood grain, or the like. Wood grain pattern 17, 19 of transaction instrument 10a, 10b may be located on the front side of transaction instrument 10a, 10b, the back side of transaction instrument 10a, 10b, or both. In some examples, wood grain pattern 17, 19 may cover the entire front and/or back side of transaction instrument 10a, 10b. In other examples, wood grain pattern 17, 19 may only be included within designated areas of transaction instrument 10a, 10b, such as, for example, on an edge of transaction instrument 10a, 10b, near or around IC 12, or near or around a magnetic stripe on the back side of transaction instrument 10a, 10b. In some examples, unique wood grain pattern 17, 19 of transaction instrument 10a, 10b may be used as an authentication factor for transaction instrument 10a, 10b. For instance, upon use of transaction instrument 10a, 10b to perform a transaction at a POS device, an automatic teller machine (ATM), or another computing device, an authentication server may verify the transaction by comparing wood grain pattern 17, 19 read from transaction instrument 10a, 10b to an expected wood grain pattern associated with user account information.

Figure 2:
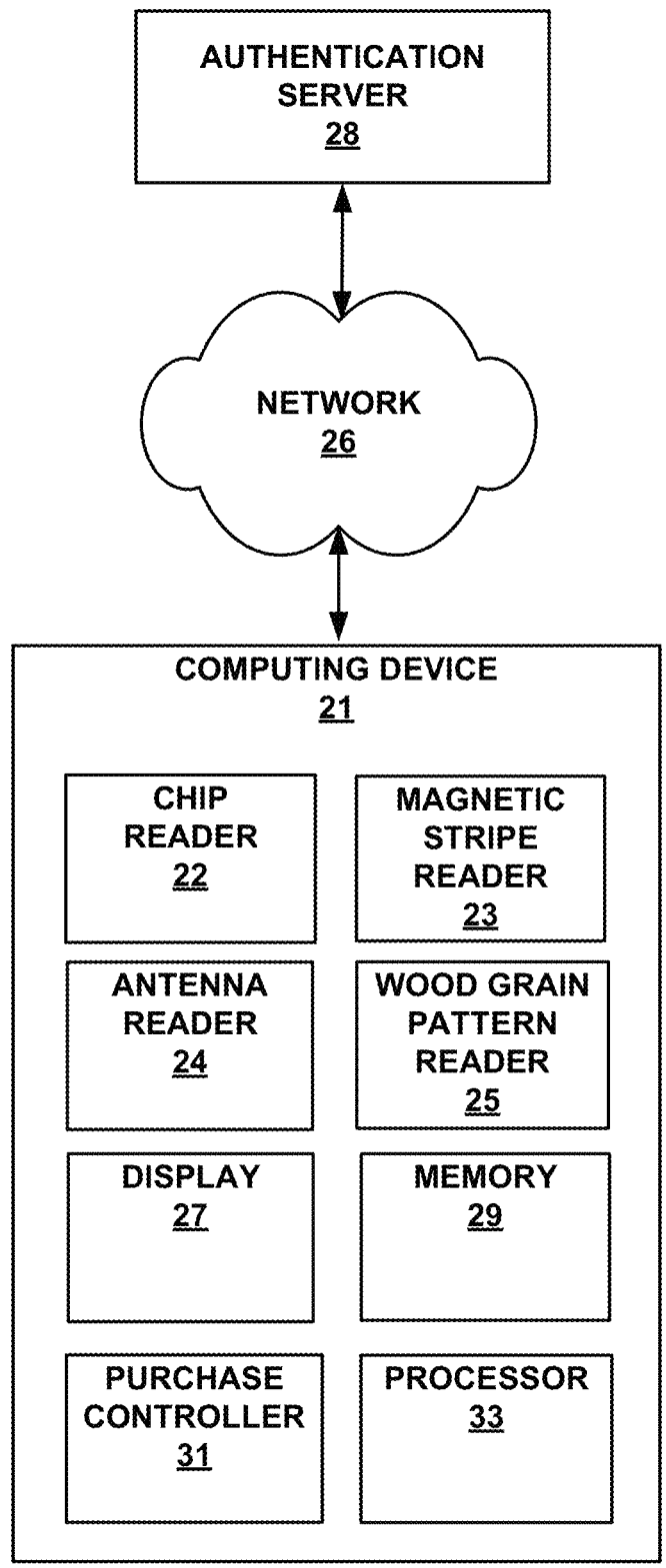
FIG. 2 is a block diagram illustrating an example system that includes a computing device configured to read a densified wood transaction instrument to perform a transaction and an authentication server configured to authenticate the transaction performed by the densified wood transaction instrument, in accordance with the techniques of this disclosure.

FIG. 2 is a block diagram illustrating an example system 20 that includes a computing device 21 configured to read a densified wood transaction instrument to perform a transaction and an authentication server 28 configured to authenticate the transaction performed by the densified wood transaction instrument, in accordance with the techniques of the disclosure. The example of FIG. 2 will be described with respect to transaction instruments 10a, 10b of FIG. 1. In other examples, however, other transaction instruments may be used with system 20 of FIG. 2.

Computing device 21 may be a device used to perform a variety of transactions and/or account balance checks. For example, computing device 21 may be a point of sale (POS) device, an automatic teller machine (ATM), a "pay at the pump" gas station terminal, a "self-checkout" store terminal, or another computing device configured to enable a user to perform a transaction using transaction instrument 10a, 10b. Computing device 21 may be located at any suitable location. For example, computing device 21 may be located at a merchant, such as a store or restaurant, a gas station, a retail banking location, or the like.

In some examples, computing device 21 includes a display 27, a memory 29, a purchase controller 31, and a processor 33. In some such examples, purchase controller 31 may be a software module configured to execute functions attributed to computing device 21 herein, memory 29 may store instructions relating to the functions attributed to computing device 21, and processor 33 may execute the functions (e.g., executes the actions of purchase controller 31).

Display 27 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 27 may output information to a user in the form of a user interface which may be associated with functionality provided by computing device 21. In some examples, display 27 may be implemented external to computing device 21. As such, display 27 may include an external or partially external component that shares a data path with computing device 21 for transmitting and/or receiving input and output. For instance, in some examples, display 27 may include an external component of computing device 21 that is located outside and physically separated from the packaging or housing of computing device 21 (e.g., a monitor, a projector, etc. that shares a wired and/or wireless data path with computing device 21). In other examples, display 27 may be a part of computing device 21 (e.g., not an external component).

As seen in FIG. 2, computing device 21 also includes a chip reader 22, a magnetic stripe reader 23, an antenna reader 24, and a wood grain pattern reader 25. In some cases, one or more of chip reader 22, magnetic stripe reader 23, antenna reader 24, and wood grain pattern reader 25 may be used to access financial information of a user and/or authenticate a user during a transaction. For example, one of chip reader 22, magnetic stripe reader 23, antenna reader 24, or wood grain pattern reader 25 may be used to access financial information associated with the user from transaction instrument 10a, 10b, and send such information to authentication server 28 via network 26 for verification.

Chip reader 22 may be configured to access information stored on IC 12 of transaction instrument 10a, 10b. For example, computing device 21 may include a "dip" card reader into which a user may insert transaction instrument 10a, 10b and chip reader 22 may read information stored on IC 12. The "dip" card reader may receive the entirety of transaction instrument 10a, 10b, or at least a portion of transaction instrument 10a, 10b that includes IC 12.

Magnetic stripe reader 23 may be configured to access information stored on a magnetic stripe of transaction instrument 10a, 10b (not shown in FIG. 1). In some such examples, a user may swipe a portion of transaction instrument 10a, 10b that includes a magnetic stripe through magnetic stripe reader 23. As another example, a "dip" reader may be configured to access information stored on the magnetic stripe. For instance, the "dip" card reader may receive the entirety of transaction instrument 10a, 10b, or at least a portion of transaction instrument 10a, 10b that includes the magnetic stripe. In some such examples, a user may insert and remove transaction instrument 10a, 10b in the "dip" card reader to effectively swipe the magnetic stripe, or the user may insert transaction instrument 10a, 10b into the "dip" card reader for magnetic stripe reader 23 to read the information stored on the magnetic stripe.

Antenna reader 24 may be configured to receive information stored on transaction instrument 10a, 10b (e.g., on IC 12) from antenna element 14. In some cases, computing device 21 may send an electromagnetic signal to antenna element 14 to power IC 12. After receiving the electromagnetic signal from computing device 21, antenna element 14 may send an electromagnetic signal including the information stored on IC 12 to computing device 21. In some examples, the electromagnetic signals may be sent and/or received by a user placing or "swiping" the respective transaction instrument 10a, 10b near computing device 21. Computing device 21 and antenna element 14 may send and receive the electromagnetic signals based on any suitable short-range communication standard. For example, computing device 21 and antenna element 14 may send and receive the electromagnetic signals via RFID, NFC, WiFi, Bluetooth®, or the like.

In any case, chip reader 22, magnetic stripe reader 23, or antenna reader 24 may receive information (e.g., financial information) from transaction instrument 10a, 10b and send the information from transaction instrument 10a, 10b to authentication server 28 for verification. For example, chip reader 22, magnetic stripe reader 23, or antenna reader 24 may send an account number of the user, the user's name, an expiration date of transaction instrument 10a, 10b, a merchant identification number, a credit limit, an amount of available funds, or the like to authentication server 28.

In some examples, computing device 21 may have direct access to network 26 such that computing device 21 directly interacts with authentication server 28 through network 26 to authenticate transaction instrument 10a, 10b. In some examples, network 26 may be a private network or a public network, such as the Internet. Although illustrated as a single entity, network 26 may include a combination of two or more public and/or private networks. Network 26 may include one or more of a wide area network (WAN) (e.g., the Internet), a local area network (LAN), a virtual private network (VPN), or another wired or wireless communication network. In some examples, network 26 may be a service provider network coupled to one or more networks administered by other providers, and may thus form part of a large-scale public network infrastructure, e.g., the Internet.

In other examples, computing device 21 may not have direct access to network 26 and instead may communicate with network 26 through a local access device or access network (not shown). For example, computing device 21 may be a POS device that does not have internet connectivity, but rather is connected to a local area network which includes the local access device that is connected to network 26.

Authentication server 28 may include a cluster of one or more computers, workstations, servers, and the like. Authentication server 28 may be owned or otherwise managed or used by the financial institution that issues transaction instrument 10a, 10b. In some examples, authentication server 28 may establish and maintain a log of transactions using transaction instrument 10a, 10b. Authentication server 28 may add new entries to this log with additional transactions as authenticated by authentication server 28

In some examples, authentication server 28 may authorize a transaction upon matching an authentication factor to a predicted authentication factor. In some examples, this authentication factor is created by transaction instrument 10a, 10b using a "seed" or authentication key stored by IC 12 or the magnetic stripe. The authentication key may be a substantially unique series of characters, such that it may be relatively difficult to guess the authentication key and it is relatively unlikely for two transaction instruments 10 to have identical authentication keys. The authentication key may be initially created by the financial institution of transaction instrument 10a, 10b and authentication server 28. The financial institution may create the authentication key such that the only two copies of the authentication key are stored by/on authentication server 28 and transaction instrument 10a, 10b. In some examples, both transaction instrument 10a, 10b and authentication server 28 are configured to never transmit the authentication key, such that computing device 21 is configured to execute the transaction without receiving, storing, or otherwise directly using the authentication key. Rather, purchase controller 31 may receive a verification from authentication server 28 that authentication server 28 was able to successfully authenticate transaction instrument 10a, 10b (e.g., using the authentication key unique to transaction instrument 10a, 10b).

In some examples, authentication server 28 may use additional or alternative techniques to authenticate transaction instrument 10a, 10b. For instance, in examples in which transaction instrument 10a, 10b includes a debit card, computing device 21 may prompt the user to enter a PIN using computing device 21 for verification. Computing device 21 may send the received PIN to authentication server 28 for verification. If the received PIN is the same as an expected PIN for transaction instrument 10a, 10b, authentication server 28 may approve the transaction. If the received PIN is different than the expected PIN, authentication server 28 may deny the transaction.

Additionally, or alternatively, authentication server 28 may authenticate transaction instrument 10a, 10b based on wood grain pattern 17, 19. For example, each transaction instrument 10a, 10b may have a unique wood grain pattern 17, 19 that may be authenticated by authentication server 28. In some examples, transaction instrument 10a, 10b may include a dye (e.g., an ultra violet dye or a reflective dye), a lasered image, or another enhancement mechanism to supplement wood grain pattern 17, 19. For example, the dye, lasered image, or the like may be used to outline, fill in, or otherwise enhance wood grain pattern 17, 19 of transaction instrument 10a, 10b. In some examples, such enhancement mechanisms may not be visible by looking at transaction instrument 10a, 10b alone. In this way, the authentication of transaction instrument 10a, 10b using wood grain pattern 17, 19 may not be readily apparent (e.g., to a bad actor). In some cases, a location of wood grain pattern 17, 19 or a specific portion of wood grain pattern 17, 19 may be used for verification of transaction instrument 10a, 10b. For example, only half (or another proportion) of wood grain pattern 17, 19 may be determined by wood grain pattern reader 25 to be used for authentication.

In some examples, wood grain pattern 17, 19 may have a hash value associated with it, and the hash value may be used for authentication of wood grain pattern 17, 19. For example, a hash function may be used to calculate the hash value associated with wood grain pattern 17, 19. In some such examples, the hash function may be stored on IC 12, a magnetic stripe of transaction instrument 10a, 10b, or on authentication server 28. As another example, transaction instrument 10a, 10b may further include a quick response (QR) code that stores the hash function used to determine the hash value associated with wood grain pattern 17, 19. In some examples, the QR code may additionally, or alternatively, represent wood grain pattern 17, 19 (e.g., such that wood grain reader 25 can determine wood grain pattern 17, 19 using the QR code) or store a location of wood grain pattern 17, 19 to be used for the authentication.

Wood grain pattern reader 25 may be configured to determine wood grain pattern 17, 19 of transaction instrument 10a, 10b so that the hash value associated with wood grain pattern 17, 19 can be calculated. As one example, wood grain pattern reader 25 may be able to scan transaction instrument 10a, 10b, or a designated area of transaction instrument 10a, 10b, to determine wood grain pattern 17, 19 of transaction instrument 10a, 10b. As another example, wood grain pattern reader 25 may determine wood grain pattern 17, 19 from a QR code on transaction instrument 17, 19. In some examples, computing device 21 may then calculate the hash value associated with wood grain pattern 17, 19 using the hash function. In other examples, computing device 21 may send the determined wood grain pattern 17, 19 to authentication server 28, and authentication server 28 may calculate the hash value. Authentication server 28 may compare the hash value to an expected hash value of wood grain pattern 17, 19 to authenticate transaction instrument 10a, 10b.

Additionally, or alternatively, display 27 may output an image of wood grain pattern 17, 19 of transaction instrument 10a, 10b for comparison by an employee or attendant handling the transaction using transaction instrument 10a, 10b. In some cases, transaction instrument 10a, 10b may send an image of transaction instrument 10a, 10b to display 27 via RFID, NFC, WiFi, Bluetooth®, a text message, and/or over a network. In other cases, wood grain pattern reader 25 may determine wood grain pattern 17, 19 and output the determined wood grain pattern 17, 19 to display 27. The employee or attendant may then be able to visually compare the image of wood grain pattern 17, 19 output on display 27 with wood grain pattern 17, 19 of transaction instrument 10a, 10b to determine whether wood grain pattern 17, 19 of transaction instrument 10a, 10b matches the displayed image. For example, the employee or attendant may compare the lines or grains of wood grain pattern 17, 19, the color of wood grain pattern 17, 19, or any additional or alternative qualities of wood grain pattern 17, 19 to determine if the transaction should be approved.

As another example, an image of wood grain pattern 17, 19 of transaction instrument 10a, 10b may be lasered into a spot on a back side of transaction instrument 10a, 10b, and an employee may be able to determine if the lasered image matches wood grain pattern 17, 19 of the front of transaction instrument 10a, 10b by illuminating transaction instrument 10a, 10b with a specific frequency. For example, illuminating transaction instrument 10a, 10b with the specific frequency of light may present a reflection of wood grain pattern 17, 19. The employee may then be able to determine if the lasered image on the back of transaction instrument 10a, 10b aligns with the reflection of the actual wood grain of the front of transaction instrument 10a, 10b.

If authentication server 28 (or an employee) determines that wood grain pattern 17, 19 or the hash value associated with wood grain pattern 17, 19 of transaction instrument 10a, 10b is the same or substantially the same (e.g., accounting for scratches, dirt, or the like) as the expected wood grain pattern or hash value, respectively, authentication server 28 authenticates the transaction using transaction instrument 10a, 10b. If authentication server 28 (or an employee) determines that wood grain pattern 17, 19 or the hash value associated with wood grain pattern 17, 19 of transaction instrument 10a, 10b is not the same or substantially the same (e.g., accounting for scratches, dirt, or the like) as the expected wood grain pattern or hash value, respectively, authentication server 28 may deny the transaction using transaction instrument 10a, 10b and/or flag the transaction for additional verification.

In some examples, the use of wood grain pattern 17, 19 as an authentication factor may be used in addition to other authentication factors. For example, in examples in which transaction instrument 10a, 10b includes a debit card, the authentication factor associated with wood grain pattern 17, 19 may be used in addition to the conventional two-factor authentication scheme (e.g., presence of transaction instrument 10a, 10b and a personal identification number (PIN)), thus providing a three-factor authentication scheme. Moreover, authentication factors based on wood grain pattern 17, 19 may be relatively difficult, or even impossible, to replicate. For example, in some cases, computing device 21 and authentication server 28 may authenticate wood grain pattern 17, 19 by sending the associated hash value, without sending the determined wood grain pattern 17, 19 itself. In some such examples, even if a bad actor were to intercept the calculated hash value, it may be extremely difficult or impossible for the bad actor to replicate wood grain pattern 17, 19 based on the intercepted hash value. Thus, transaction instruments 10a, 10b including authentication factors based on wood grain patterns 17, 19 may be more secure than some other transaction instruments.

Figure 3:
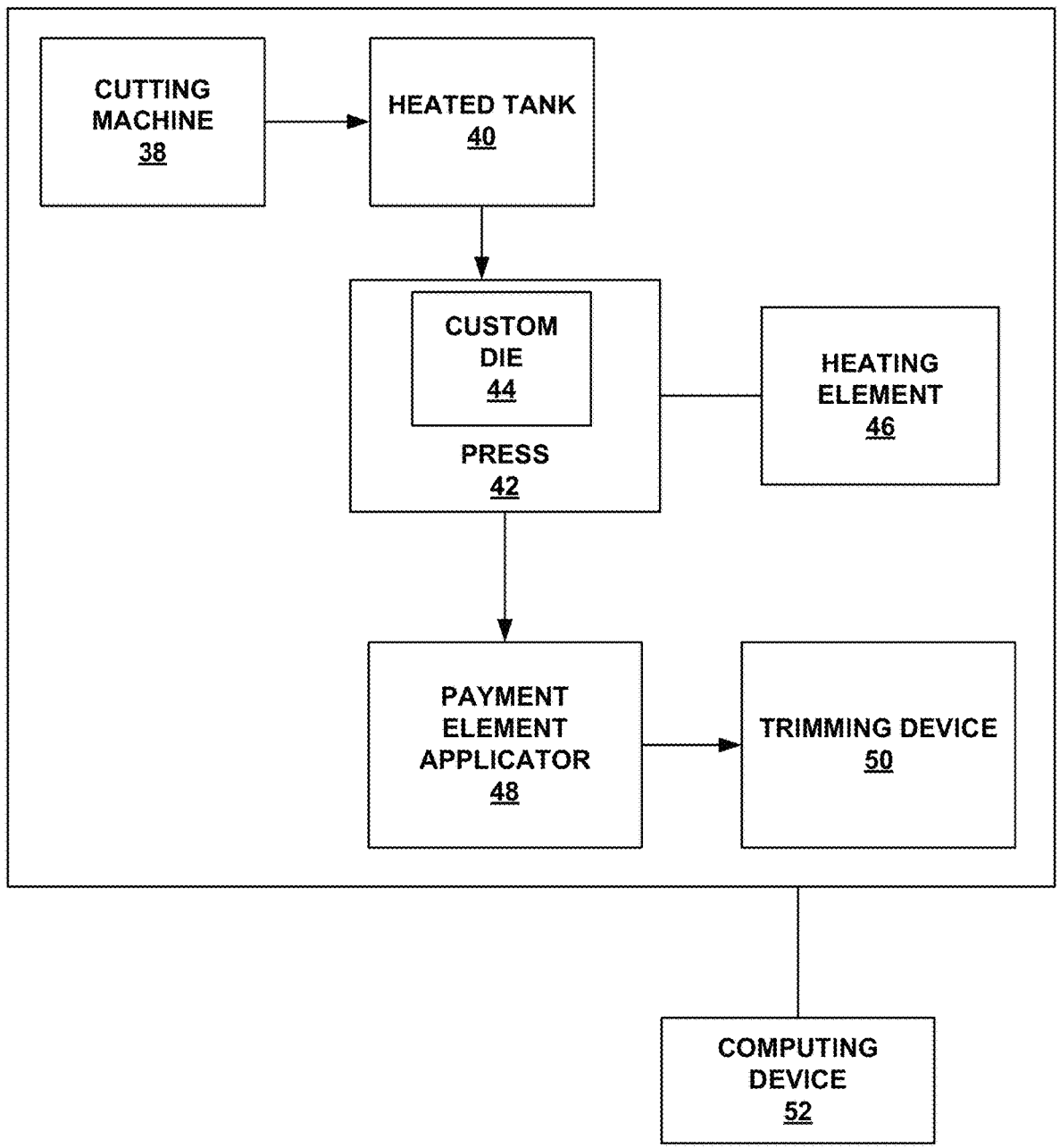
FIG. 3 is a block diagram illustrating an example system for manufacturing one or more densified wood transaction instruments, in accordance with the techniques of the disclosure.

FIG. 3 is a block diagram illustrating an example system 36 for manufacturing one or more densified wood transaction instruments, in accordance with the techniques of the disclosure. System 36 includes a cutting machine 38, a heated tank 40, a custom die 44 in a press 42 coupled to a heating element 46, a payment element applicator 48, a trimming device 50, and a computing device 52. Cutting machine 38 is configured to cut a sheet of wood to a desired size. Cutting machine 38 may include any suitable cutting machine. In some examples, cutting machine 38 includes a saw mill, a miniature saw mill, a band saw, a head rig, an edger saw, a gang saw, a trim saw, a head saw, or a frame saw. In other examples, cutting machine 38 may include a different type of cutting machine.

Heated tank 40 is configured to boil a sheet of wood in a chemical solution. Heated tank 40 may include a tank or another storage vessel equipped with a heating element configured to boil a chemical solution. For example, heated tank 40 may be equipped with a heat exchanger, a furnace, an over the side heater, a circulation heater, a screw plug heater, a flange heater, or another type of heater.

Press 42 may be configured to compress a sheet of wood. Press 42 may include any suitable press configured to compress a sheet of wood in a custom die. In some examples, press 42 may include a hot press or may otherwise be coupled to heating element 46.

Custom die 44 may be configured to form one or more features in a sheet of wood during compression of the sheet of wood in press 42. For example, custom die 44 may include feature elements configured to form at least one feature for attachment of a payment element to a densified wood transaction instrument, such as, for example, a feature element configured to form at least one of an IC feature, a magnetic stripe feature, or an antenna feature. In some examples, custom die 44 may optionally include feature elements configured to form one or more of a card blank outline, an account number, a demarcation, a user's name, or an expiration date. In other examples, at least one of a card blank outline, an account number, a demarcation, a user's name, or an expiration date may be added to the densified wood transaction instruments in another way. For example, a different die (other than custom die 44 used to form at one feature for attachment of one or more payment elements) may be used to form at least one of a card blank outline, an account number, a demarcation, a user's name, or an expiration date. As another example, a card blank outline, an account number, a demarcation, a user's name, an expiration date, or other features may be formed on the transaction instruments by printing, charring, branding, milling, or another technique.

Custom die 44 may be made of any suitable material capable of withstanding heat generated by heating element 46 during compression of the sheet of wood in press 42. In other words, custom die 44 may be made of a material capable of withstanding the heat generated by heating element 46 without deforming, losing details of the feature elements configured to form the various features in the sheet of wood, or the like. As one example, custom die 44 may be made of a metal capable of withstanding the heat generated by heating element 46. As another example, custom die 44 may include a different material capable of withstanding the heat generated by heating element 46. For instance, in examples in which an end user customized a shape or format of a transaction instrument, custom die 44 may include a customized 3D printed die.

Payment element applicator 48 is configured to attach one or more payment elements to at least one feature formed in a sheet of densified wood. In some examples, payment element applicator 48 may include a magnetic stripe roller configured to attach a magnetic stripe to a magnetic stripe feature and/or a IC chip picker configured to attach an IC chip to an IC feature. In other examples, payment element applicator 48 may include any suitable device configured to attach one or more payment elements (e.g., a magnetic stripe, an IC, an antenna element, or the like) to at least one feature of the densified sheet of wood.

Trimming device 50 may trim one or more transaction instruments from a densified sheet of wood. In some examples, trimming device 50 may include a sheet stamper or a precision cutting system. In other examples, trimming device 50 may include another trimming device.

Computing device 52 may be configured to control operation of system 36, including, for example, cutting machine 38, heated tank 40, press 42, heating element 46, payment element applicator 48, and/or trimming device 50. For example, computing device 52 may be configured to control operation of cutting machine 38, heated tank 40, press 42, heating element 46, payment element applicator 48, and/or trimming device 50 to position sheet of wood 58, densified sheet of wood 62, and/or transaction instruments 76 in a certain orientation or location relative to cutting machine 38, heated tank 40, press 42, heating element 46, payment element applicator 48, and/or trimming device 50. For example, computing device 52 may position sheet of wood 58, densified sheet of wood 62, and/or transaction instruments 76 using demarcations 68f, 70c to facilitate any of the steps attributed to the techniques of the disclosure. Thus, computing device 52 may be communicatively coupled to at least one of cutting machine 38, heated tank 40, press 42, heating element 46, payment element applicator 48, and/or trimming device 50 using respective communication connections. Such connections may be wireless or wired connections.

Computing device 52 may include, for example, a desktop computer, a laptop computer, a workstation, a server, a mainframe, a cloud computing system, or the like. Computing device 52 may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 52 may be provided within dedicated hardware and/or software modules.

Figure 4:
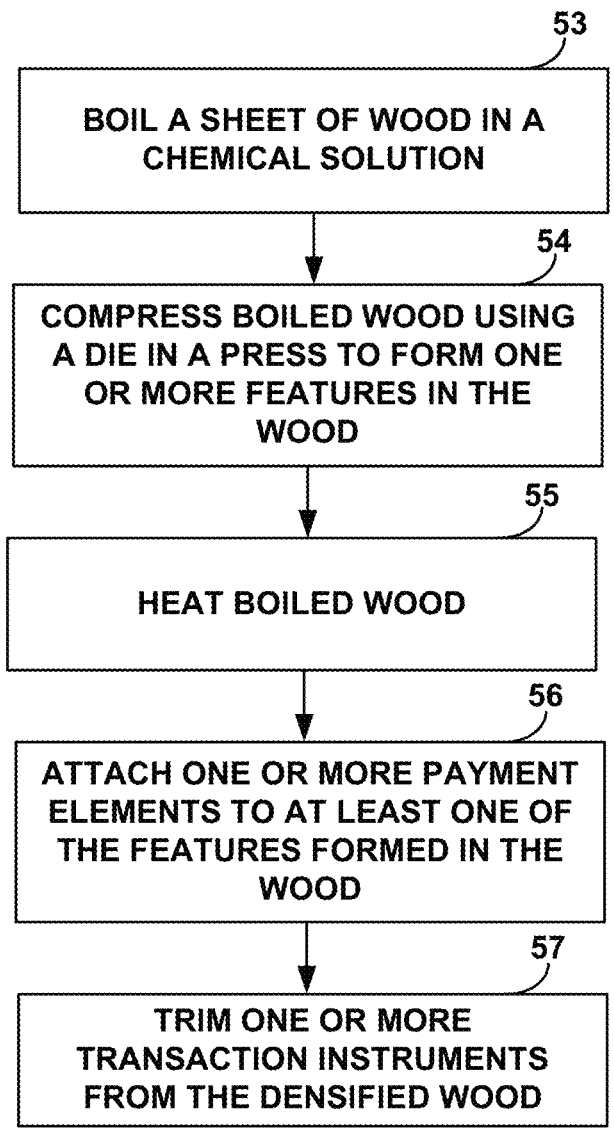
FIG. 4 is a flow diagram illustrating an example operation for manufacturing one or more densified wood transaction instruments, in accordance with the techniques of the disclosure.

FIG. 4 is a flow diagram illustrating an example operation for manufacturing one or more densified wood transaction instruments, in accordance with the techniques of the disclosure. The operation of FIG. 4 will be described with respect to system 36 of FIG. 3 for ease of description only; in other examples, other systems may be used to perform the example operation of FIG. 4.

The example operation of FIG. 4 optionally includes selecting a type of wood. For example, wood types may be selected based on color, texture, properties (e.g., weight, strength, etc.), wood grain pattern characteristics, or the like. In some examples, selecting the type of wood may include selecting a type of wood including at least one of beech, ash, oak, mahogany, maple, walnut, pine, birch, cherry, spruce, cedar, fir, or larch. In other examples, other types of woods may be selected.

The example operation of FIG. 4 may also include cutting the wood to a desired size. For example, a sheet of wood may be cut to a specific size in order to create a specific number of transaction instrument blanks (e.g., card blanks) from the sheet of wood. In some cases, the example operation of FIG. 4 to create densified wood transaction instruments may result in the sheet of wood being reduced to about 20% of its original size in one or more directions. Thus, the sheet of wood may be cut to a specific size that accounts for the reduction in size in addition to, or as an alternative to, accounting for a desired number of card blanks. In yet other examples, the sheet of wood may not be cut to a specific size.

Next, the sheet of wood, either cut or uncut, is boiled in a chemical solution (53). For example, the sheet of wood may be boiled in the chemical solution using a heated tank 40. Boiling the sheet of wood in the chemical solution may make the sheet of wood more porous and less rigid. Based on currently available information, which is not intended to be limiting, boiling the sheet of wood in the chemical solution may substantially reduce an amount of lignin and an amount of hemicellulose in the sheet of wood, while not reducing, or not substantially reducing, an amount of cellulose in the sheet of wood. In turn, the sheet of wood may be made more porous.

In some examples, the sheet of wood may be boiled in a chemical solution including sodium hydroxide (NaOH) and sodium sulfite ($Na_2SO_3$). Without being bound by theory, currently available information may indicate that various components of the sheet of wood (e.g., lignin, hemicellulose, and cellulose) may have different chemical stabilities in the chemical solution including sodium hydroxide and sodium sulfite. For example, lignin and hemicellulose may be less stable in the chemical solution including sodium hydroxide and sodium sulfite in comparison to cellulose, which may result in the relatively significant reduction of lignin and hemicellulose in comparison to the relatively little reduction of cellulose when the sheet of wood is boiled in the chemical solution. In other examples, the chemical solution may have a different chemical composition.

In some cases, a dye configured to alter the color of the sheet of wood may be added to the chemical solution. For example, the sheet of wood may be dyed a different color, a different shade, or the like. Additionally, or alternatively, the color of the sheet of wood may be altered separately from the chemical solution. For example, the sheet of wood may be dyed before or after being boiled in the chemical solution. In some examples, the sheet of wood may be modified in ways other than by altering the color of the sheet of wood. Examples of other modifications and customizations will be described in more detail below.

The example operation of FIG. 4 further includes compressing the boiled the sheet of wood to form one or more features in the sheet of wood (54) and heating the sheet wood during compressing of the sheet of wood to create a densified sheet of wood (55). For example, the sheet of wood may be simultaneously compressed and heated in custom die 44 in press 42 coupled to heating element 46. In this way, the sheet of wood can be heated during the compressing of the boiled the sheet of wood. In some such examples, the sheet of wood may be heated to about 100° C. Without intending to be limiting, the combination of compressing and heating the sheet of wood may cause the cell lumina and/or the cell walls of the cells forming the sheet of wood to collapse, thereby densifying the sheet of wood. In turn, the cell walls may become intertwined and densely packed along a length of the sheet of wood. In other examples, the cell walls may become intertwined and/or densely packed in other directions. The densification of the sheet of wood in this manner may result in about a 3-fold increase in density as well as reduced swelling of the densified sheet of wood when exposed to moisture.

Press 42 may be configured to compress the sheet of wood in one or more directions. For example, in some cases, press 42 may be configured to compress the sheet of wood in a direction perpendicular to a wood growth or wood grain direction. In some examples, compression of the sheet of wood may result in the densified sheet of wood with a thickness that is about 20% of the thickness of the sheet of wood prior to the compression. In other examples, press 42 may be configured to compress the sheet of wood in additional or alternative directions. In some cases, press 42 may be configured to compress the sheet of wood in a specific direction based on the wood grain pattern of the sheet of wood in order to use the wood grain pattern as an authentication factor for the transaction instruments made from the densified sheet of wood.

As described above, the sheet of wood may be compressed in press 42 using custom die 44, and custom die 44 may be configured to form one or more features in the sheet of wood during compression of the sheet of wood in press 42. In some examples, custom die 44 may include an upper die plate and a lower die plate, where at least one die plate is configured to form one or more features in the sheet of wood during compression of the sheet of wood. Additionally, or alternatively, more than one custom die 44 may be used to form the one or more features in the sheet of wood. In any cases, custom die 44 may be configured to form the one or more features as permanent indentations in the densified sheet of wood.

Payment element applicator 48 may be used to attach one or more payment elements to at least one of the one or more features formed in the sheet of densified wood to form a sheet of one or more densified wood transaction instruments (56). For example, payment element applicator 48 may attach at least one of a IC, a magnetic stripe, or an antenna element to a corresponding feature formed in the densified sheet of wood. In some examples, an adhesive may be used to attach the one or more payment elements to the one or more features formed in the sheet of densified wood.

In some examples, trimming device 50 may trim one or more transaction instruments from the densified sheet of wood (57). Each transaction instrument includes one or more features, and at least one payment element attached to at least one feature of the one or more features.

The example operation of FIG. 4 may optionally include customizing at least one of the transaction instruments. In some examples, the at least one the transaction instrument may be customized by adding metal flake to the at least one the transaction instrument, staining the at least one the transaction instrument, charring the at least one the transaction instrument, branding the at least one the transaction instrument, laser marking the at least one the transaction instrument, impregnating the at least one the transaction instrument with ink, or combinations thereof. As one example, at least one the transaction instrument may be customized by laser writing an account number, a user's name, or an expiration date on the at least one the transaction instrument. As another example, at least one transaction instrument may be customized by micro-milling and filling the micro-milled portions with ink, metal, or another material, such that, for example, the micro-milled portions contrast with the color of the densified wood the transaction instruments.

In some examples, the example operation of FIG. 4 optionally includes impregnating and/or coating the transaction instruments, the densified sheet of wood, and/or the sheet of wood with a material, such as, for example, a resin or a polymer. For instance, the transaction instruments maybe coated with a material configured to seal the transaction instruments, which may protect the transaction instruments from moisture, scratches, or the like. As a further example, the densified sheet of wood and/or the sheet of wood may be impregnated with a resin or polymer configured to alter the texture of the transaction instruments, make the transaction instruments more durable, provide a better surface for certain customizations (e.g., better adherence of ink during laser or ink jet printing, added carbon for more uniform laser writing, branding, and/or charring), modify the compatibility of the wood with another material (e.g., an adhesive), or the like. In other examples, the transaction instruments, the densified sheet of wood, and/or the sheet of wood may be impregnated and/or coated with a material for additional or alternative purposes.

In some cases, the example operation of FIG. 4 may include programming the one or more payment elements of each transaction instrument (e.g., such that they can be used for transactions). The one or more payment elements may be programmed in any suitable manner.

As described above, in some examples, a wood grain pattern of the one or more the transaction instruments may be used as an authentication factor for authentication of the transaction instrument. Thus, in some cases, the example operation of FIG. 4 includes determining a wood grain pattern of each transaction instrument and creating an authentication factor for each transaction instrument based on the wood grain pattern. In some such examples, information relating to the wood grain pattern of each transaction instrument may be stored on a memory of an IC and/or a magnetic stripe during programming of the payment elements. For example, a hash function used to calculate a hash value associated with the wood grain pattern may be stored on the IC and/or magnetic stripe.

Although the example operation of FIG. 4 is described with respect to a single layer of densified wood being used to form the transaction instruments, in other examples, more than one layer of densified wood may be used to form the transaction instruments. For example, the transaction instruments may be formed with two layers of densified wood, such as, for instance, using a split core technique. An example operation of a split core technique will be described with respect to the example operation of FIG. 6. In other examples, the transaction instruments may include more than two layers of densified wood, or one or more layers of densified wood and one or more layers of a different material (e.g., plastic).

Figure 5A:
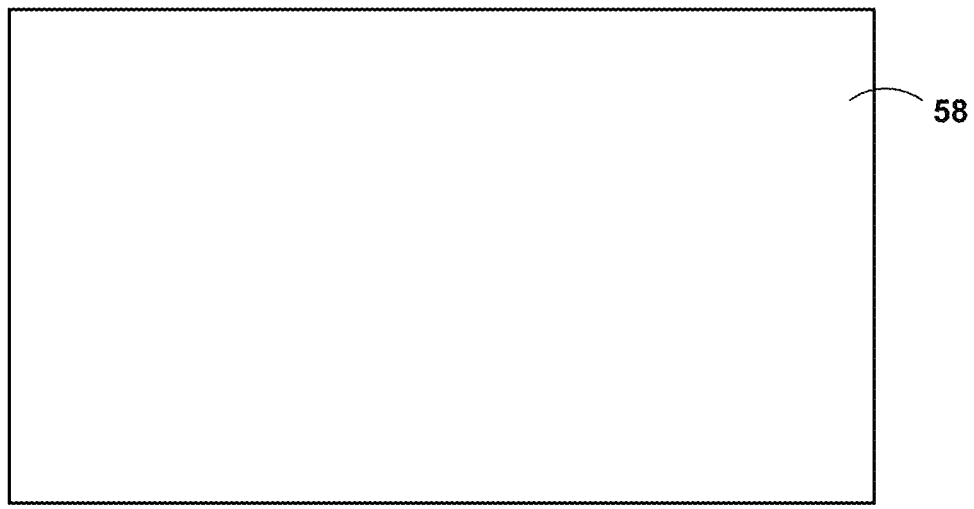
FIGS. 5A-5K are conceptual diagrams illustrating stages of the example operation for manufacturing one or more densified wood transaction instruments of FIG. 3, in accordance with the techniques of the disclosure.

FIGS. 5A-5K are conceptual diagrams illustrating stages of the example operation of FIG. 4. An example of a sheet of wood 58 is shown in FIG. 5A. In some examples, sheet of wood 58 has been cut to a desired size.

Figure 5B:
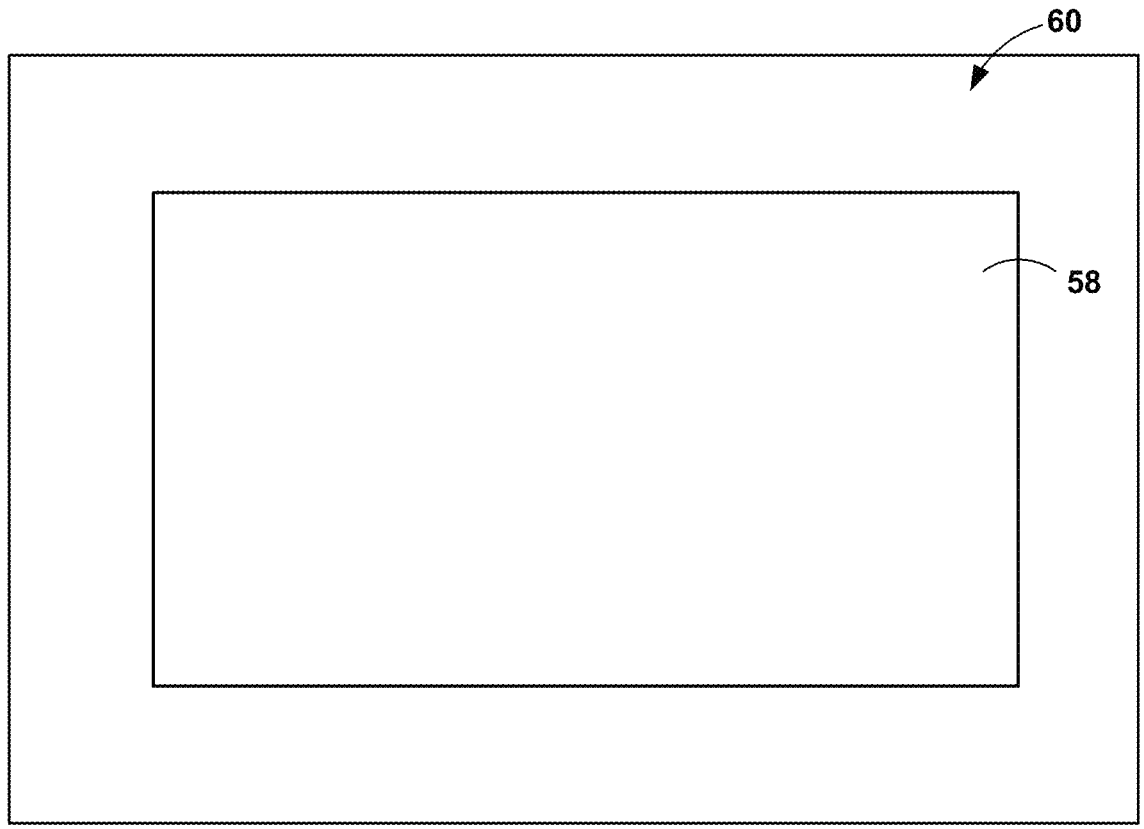

FIG. 5B illustrates sheet of wood 58, either cut or uncut, boiling in a chemical solution 60. In some examples, boiling sheet of wood 58 in chemical solution 60 may make sheet of wood 58 more porous and less rigid.

Figure 5C:
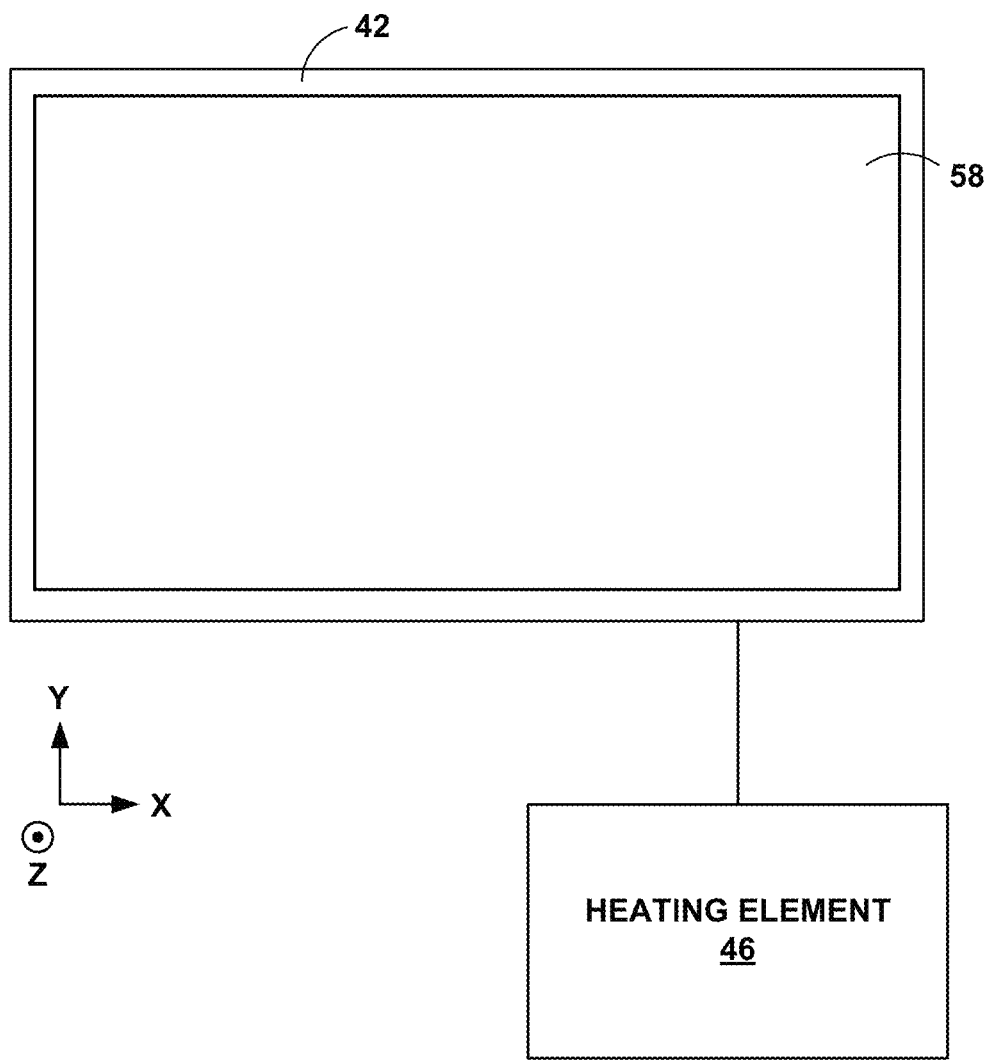

FIG. 5C illustrates sheet of wood 58 being simultaneously compressed and heated in custom die 44 in press 42 coupled to heating element 46. In some examples, press 42 is configured to compress sheet of wood 58 in a direction perpendicular to a wood growth or wood grain direction, where the wood growth or wood grain direction is in the direction of the x-axis of FIG. 5C (orthogonal x-y-z axes are shown in FIG. 5C for ease of description only). Therefore, in some examples, press 42 may be configured to compress sheet of wood 58 in the direction of the z-axis. In some examples, compression of sheet of wood 58 may result in the densified sheet of wood (shown in FIGS. 5F-5K) with a thickness (e.g., as measured along the z-axis) that is about 20% of the thickness of sheet of wood 58 (e.g., the sheet of wood prior to the compression). In other examples, press 42 may be configured to compress sheet of wood 58 in additional or alternative directions. In addition, simultaneous compression and heating of sheet of wood 58 may result in the cell walls of sheet of wood 58 may becoming intertwined (e.g., along the z-axis) and densely packed along a length of sheet of wood 58 (e.g., along the x-axis). In other examples, the cell walls may become intertwined and/or densely packed in other directions.

Figure 5D:
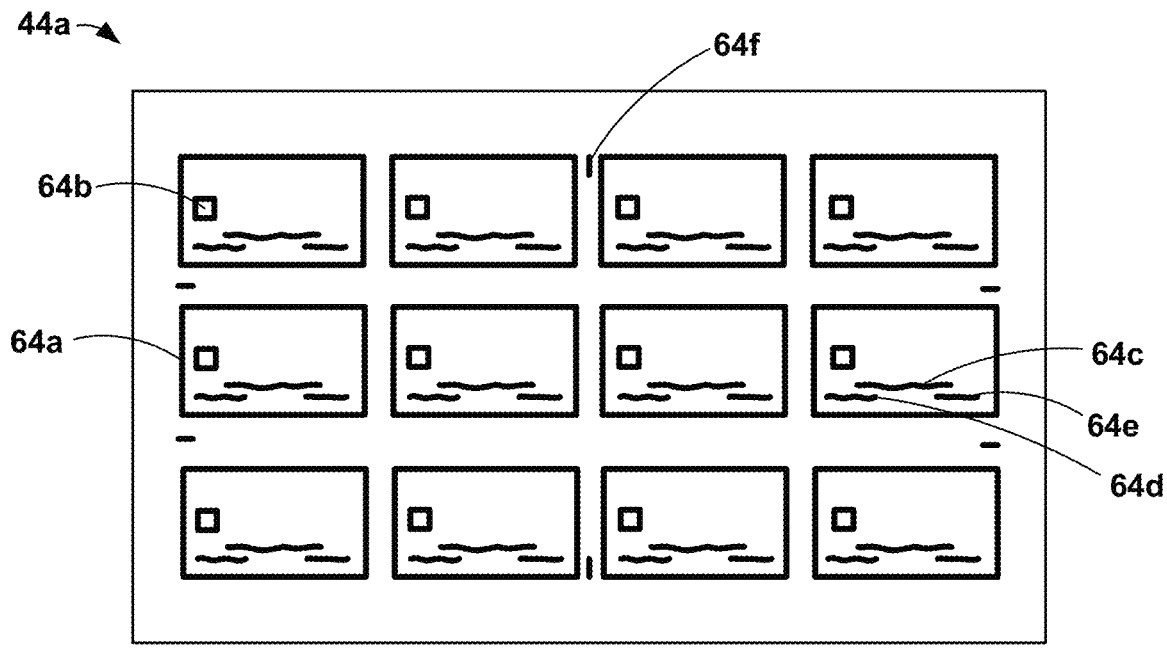
Figure 5E:
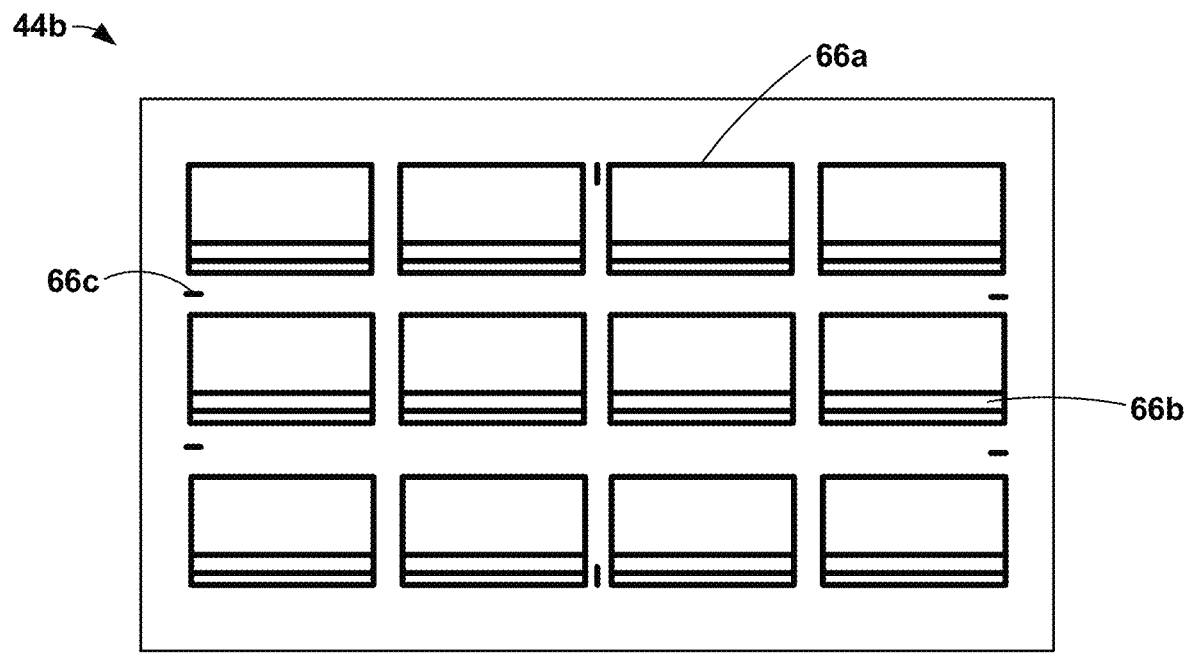

As described above, sheet of wood 58 may be compressed in press 42 using custom die 44 configured to form one or more features in sheet of wood 58 during compression of sheet of wood 58 in press 42. For instance, as seen in the examples of FIGS. 5D and 5E, custom die 44 may include an upper die plate 44*a* and a lower die plate 44*b*. Each die plate 44*a*, 44*b* is configured to form one or more features as permanent indentations in the densified sheet of wood as a result of compressing the boiled sheet of wood 58 using custom die 44 in press 42. For example, upper die plate 44*a* of FIG. 5D includes feature elements 64*a*-64*f* (collectively, "feature elements 64") configured to form card blank outlines 64*a*, IC features 64*b*, account numbers 64*c*, user's names 64*d*, expiration dates 64*e*, and demarcations 64*f*. As another example, lower die plate 44*b* of FIG. 5E includes feature elements 66*a*-66*c* (collectively, "feature elements 66") configured to form card blank outlines 66*a*, magnetic stripe features 66*b*, and demarcations 66*c*. Such feature elements 64, 66 configured to form one or more features in the densified sheet of wood as permanent indentations may enable one or more payment elements to be attached to the transaction instruments, customization of the transaction instruments, or the like. Moreover, using feature elements 64, 66 to form features in sheet of wood 58 during compression and heating of sheet of wood 58, may reduce time, cost, and a number of steps associated with manufacturing the densified wood transaction instruments described herein. For example, manufacturing the densified wood transaction instruments may not require an additional milling (or another cutting step) to remove material and form features in a sheet of wood for attachment of one or more payment elements.

In the example of FIGS. 5D and 5E, upper die plate 44*a* and lower die plate 44*b* may be used in press 42 simultaneously to each form features in a respective side of sheet of wood 58. For example, upper die plate 44*a* may form features on a front side of sheet of wood 58 (e.g., the side of sheet of wood 58 that will eventually form a front side of the transaction instruments) and lower die plate 44*b* may form features on a back side of sheet of wood 58 (e.g., the side of sheet of wood 58 that will eventually form a back side of the transaction instruments that is opposite of the front side). In some such examples, each die plate 44*a*, 44*b* includes embossed feature elements 64, 66 configured to form at least one feature on each respective side of sheet of wood 58. For instance, upper die plate 44*a* may form at least a first feature in sheet of wood 58, and lower die plate 44*b* may form at least a second feature in sheet of wood 58. In other examples, only one of upper die plate 44*a* or lower die plate 44*b* may be used in press 42 at a time, or one of upper die plate 44*a* or lower die plate 44*b* may not include embossed feature elements 64, 66.

Although upper die plate 44*a* includes feature elements 64 configured to form card blank outlines 64*a*, IC features 64*b*, account numbers 64*c*, user's names 64*d*, expiration dates 64*e*, and demarcations 64*f*, in other examples, upper die plate 44*a* may not include all feature elements 64*a*-64*f*. For example, in some cases, a different die plate may be configured to form one or more of card blank outlines 64*a*, IC features 64*b*, account numbers 64*c*, user's names 64*d*, expiration dates 64*e*, or demarcations 64*f*. As another example, one or more of card blank outlines 64*a*, IC features 64*b*, account numbers 64*c*, user's names 64*d*, expiration dates 64*e*, or demarcations 64*f* may not be formed on sheet of wood 58. For example, sheet of wood 58 may be formed without card blank outlines 64*a*, IC features 64*b*, account numbers 64*c*, user's names 64*d*, expiration dates 64*e*, and/or demarcations 64*f*, or such features may be added to sheet of wood 58 or resulting transaction instruments at a later time. For instance, one or more features, such as, for example, account numbers 64*c*, user's names 64*d*, and/or expiration dates 64*e* may be milled, printed, charred, or otherwise added to sheet of wood 58 or the resulting transaction instruments. In a similar manner, in some examples, lower die plate 44*b* may include additional or alternative feature elements 66, or may not include one or more feature elements 66*a*-66*c*. Thus, custom die 44 may include any suitable feature elements 64, 66 or may not include feature elements 64, 66. In any case, custom die 44 includes at least one feature element configured to form at least one feature in the densified sheet of wood for attachment of at least one payment element.

In some examples, feature elements 64, 66 including demarcations, card blank outlines, or both may help align and/or orient sheet of wood 58 (or the densified sheet of wood) for subsequent processing steps or for the use of additional die plates. For example, a first upper die plate may be used to a first feature on a front side of sheet of wood 58 and a second upper die plate may be used to form a second feature on the front side of sheet of wood 58. In some such examples, sheet of wood 58 including card outlines 64*a* or demarcations 64*f* may be easier to align with the second upper die plate than a sheet of wood not including card outlines 64*a* or demarcations 64*f*. Additionally, or alternatively, feature elements 64, 66 including an account number, a user's name, an expiration date, a logo, a pattern, or combinations thereof may be used to customize the transaction instruments, which, in some cases, may result in fewer processing steps being required to form transaction instruments.

In addition to the one or more features, in some examples custom die 44 may be used to embed items in each transaction instrument. For example, custom die 44 may define a feature for attachment of an item, place an item, or the like in sheet of wood 58. In some examples, the item may include a screen, a security component, a decorative component, such as a jewel, a logo, a sticker, or another item. Similar to the one or more features, inserting the item or forming a feature for the item during compression and heating of sheet of wood 58 may reduce time, cost, or manufacturing steps associated with forming the transaction instruments including the embedded items.

Figure 5F:
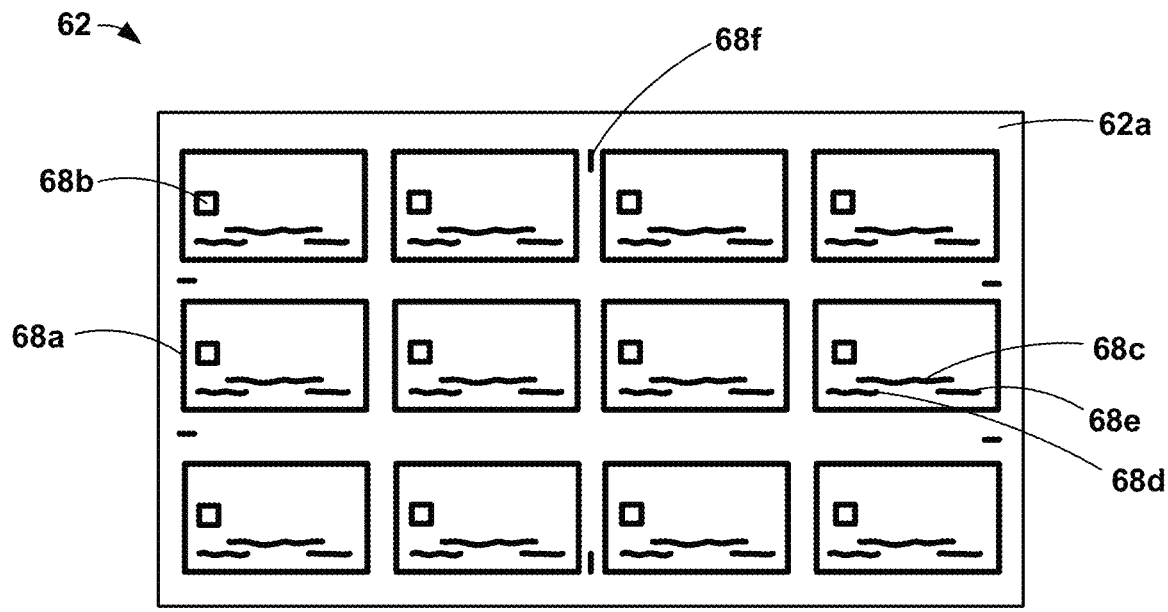
Figure 5G:
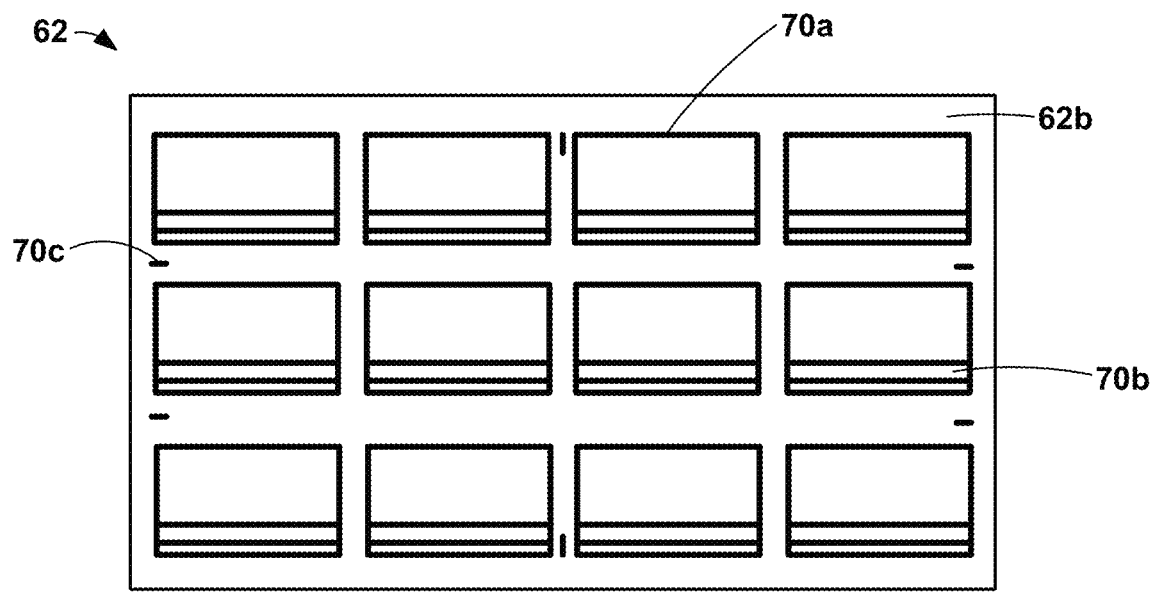

FIGS. 5F and 5G illustrate a densified sheet of wood 62 including the one or more features formed from heating and compressing sheet of wood 58 in custom die 44 using press 42. In the example of FIG. 5F, front side 62a of densified sheet of wood 62 includes features 68a-68f (collectively, "features 68") that include card blank outlines 68a, IC features 68b, account numbers 68c, user's names 68d, expiration dates 68e, and demarcations 68f. In the example of FIG. 5G, back side 62b of densified sheet of wood 62 includes features 70a-70c (collectively, "features 70") including card blank outlines 70a, magnetic stripe features 70b, and demarcations 70c. In some examples, the one or more features 68, 70 may be permanent indentations in densified sheet of wood 62. In other examples, one or more of features 68, 70 may be protrusions on densified sheet of wood 62. As one example, card blank outlines 68a, IC features 68b, demarcations 68f, card blank outlines 70a, magnetic stripe features 70b, and demarcations 70c may be indentations in densified sheet of wood 62, and account numbers 68c, user's names 68d, and expiration dates 68e may be protrusions on densified sheet of wood 62. In other examples, densified sheet of wood 62 including one or more features 68, 70 may be configured in a variety of ways. In yet other examples, densified sheet of wood 62 may include additional, alternative, or fewer features 68, 70 than those illustrated in FIGS. 5F and 5G. For example, densified sheet of wood 62 may not include account numbers 68c, user's names 68d, and expiration dates 68e formed as features in the densified sheet of wood 62. In some such examples, account numbers 68c, user's names 68d, and expiration dates 68e may be added to the densified transaction instruments using a different method (e.g., printing, charring, branding, or milling) or may be added at a later time.

Figure 5H:
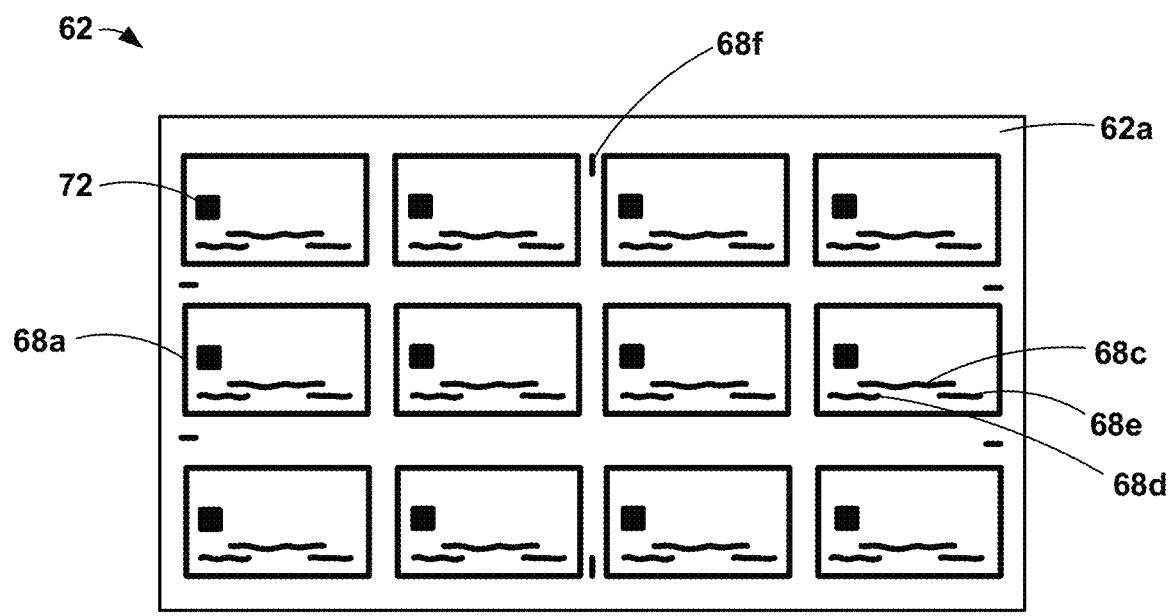
Figure 5I:
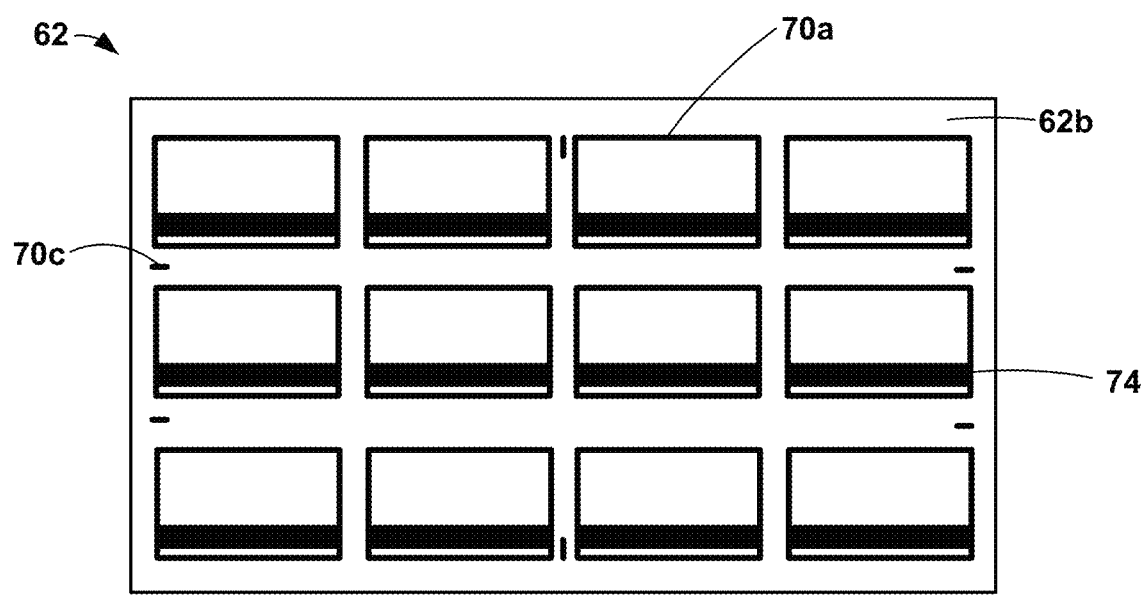

FIGS. 5H and 5I illustrate densified sheet of wood 62 including the one or more payment elements 72, 74. Payment element applicator 52 may have attached payment elements 72, 74 to one or more features of densified sheet of wood 62. For example, densified sheet of wood 62 includes IC 72 and magnetic stripe 74. As seen in FIGS. 5H and 5I, each card blank (e.g., defined by card outlines 68a and 70a) may have at least one payment element attached to at least one feature 68, 70. For example, payment element applicator 52 may attach an IC 72 and a magnetic stripe 74 to each card blank. Moreover, payment applicator 52 may attach an antenna element to an antenna feature (not shown). In any case, each card blank includes at least one of IC 72, magnetic stripe 74, or an antenna element attached to at least one feature of the one or more features 68, 70.

Figure 5J:
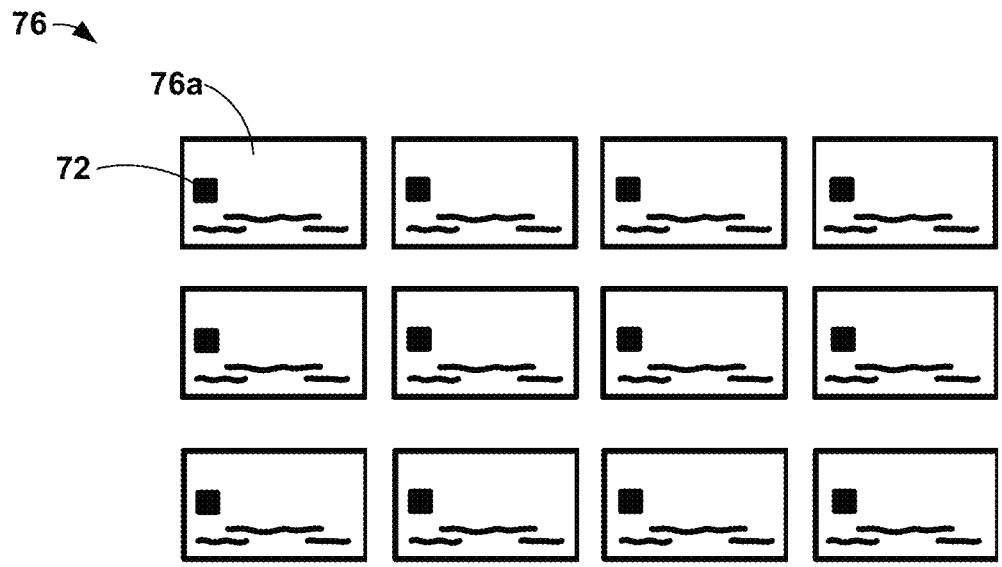
Figure 5K:
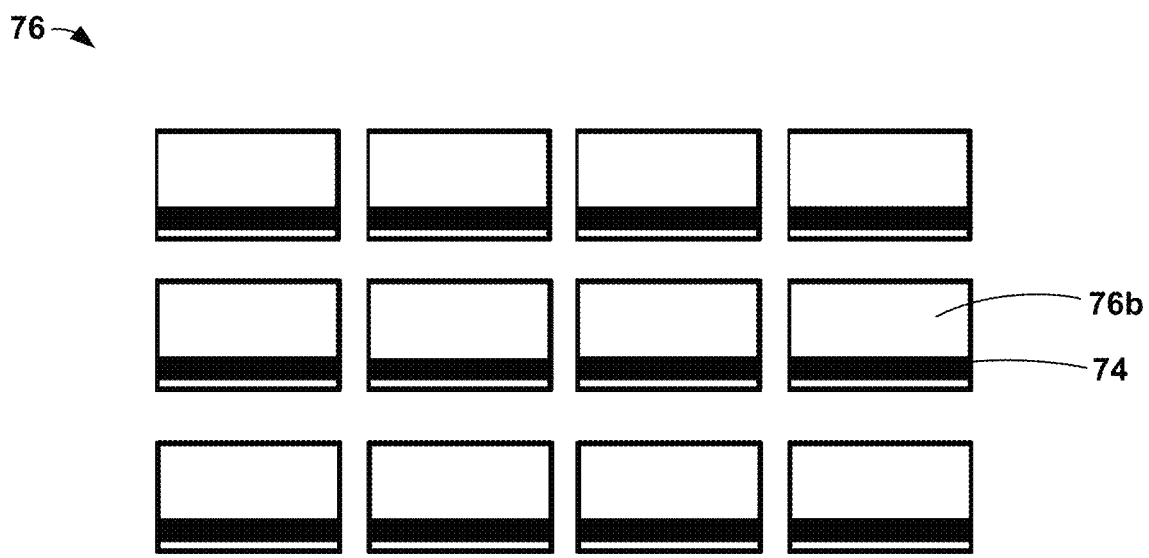

FIGS. 5J and 5K illustrate the trimmed transaction instruments 76, with FIG. 5J showing a front side 76a of transaction instruments 76 and FIG. 5K showing a back side 76b of transaction instruments 76. As seen in FIGS. 5J and 5K, each transaction instrument 76 includes one or more features 68, 70. Each transaction instrument 76 also includes at least one payment element 72, 74 attached to at least one feature of the one or more features 68, 70.

Figure 6:
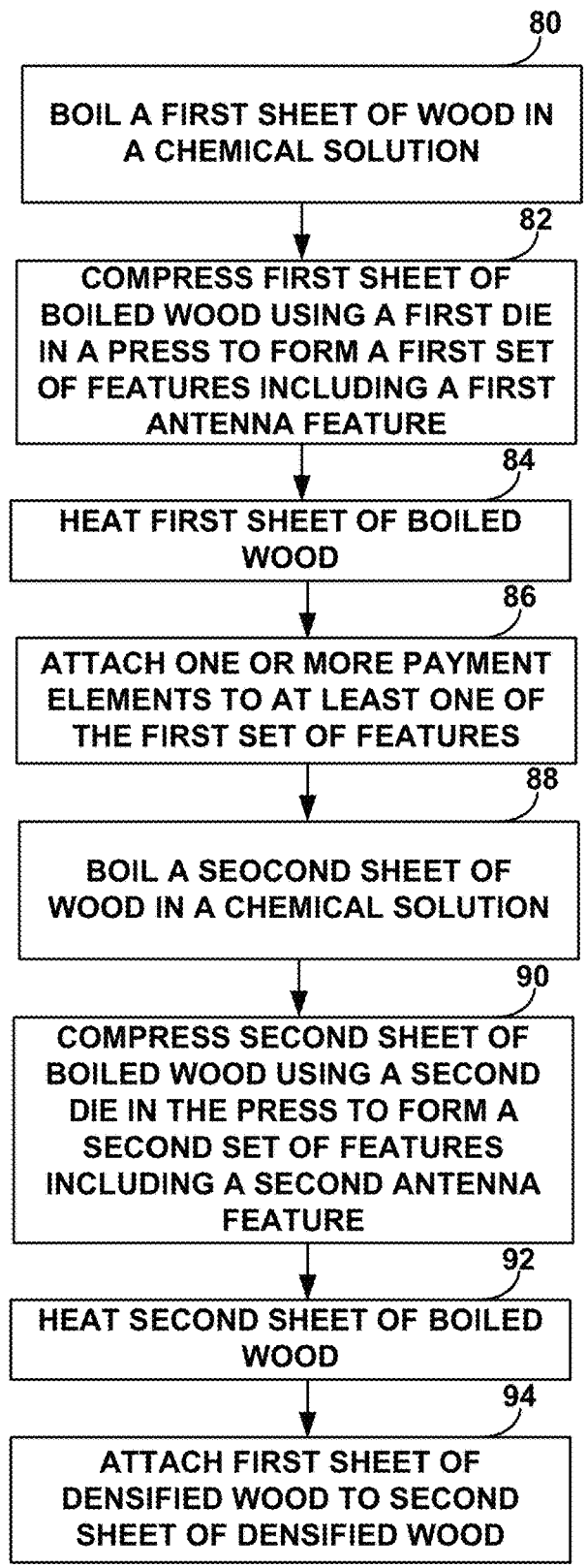
FIG. 6 is a flow diagram illustrating another example operation for manufacturing one or more densified wood transaction instruments, in accordance with the techniques of the disclosure.

FIG. 6 is a flow diagram illustrating another example operation for manufacturing one or more densified wood transaction instruments, in accordance with the techniques of the disclosure. The example operation of FIG. 6 will be described with respect to system 36 of FIG. 4 for ease of description only; in other examples, other systems may be used with the example operation of FIG. 6. The example operation of FIG. 6, or portions of the example operation of FIG. 6, may be the same or substantially the same as the example operation of FIG. 3, or corresponding portions of the example operation of FIG. 3. Thus, the details described with respect to the example operation of FIG. 3 will not be repeated with respect to FIG. 6.

The example operation of FIG. 6 optionally includes selecting a first type of wood and cutting the wood to a first sheet of wood of a desired size. In some examples, the first sheet of wood may be thinner than sheet of wood 58 of the example of FIGS. 5A-5K because the transaction instruments formed using the example operation of FIG. 6 include two layers of densified wood. The example operation of FIG. 6 includes boiling the first sheet of wood in a chemical solution (80). For example, the first sheet of wood may be boiled in the chemical solution using heated tank 40.

The boiled first sheet of wood may be compressed to form a first set of features in the first sheet of wood (82). The first set of features may include at least a first antenna feature. In some examples, the first set of features may optionally include a magnetic stripe feature, an IC feature, an account number, a user's name, an expiration date, a logo, a pattern, a demarcation, and/or an outline of the one or more transaction instruments. In other examples, one or more of the magnetic stripe feature, the IC feature, the account number, the user's name, the expiration date, the logo, the pattern, the demarcation, and/or the outline of the one or more transaction instruments may be added in a different manner (e.g., using an additional custom die, printed, or the like), or one or more of the magnetic stripe feature, the IC feature, the account number, the user's name, the expiration date, the logo, the pattern, the demarcation, and/or the outline of the one or more transaction instruments may not be included on the first sheet of wood. During compression of the first sheet of wood, the first sheet of wood may also be heated (84). A first custom die in press 42 may be used to compress the first sheet of wood, and press 42 may be coupled to heating element 46 to be able to heat the first sheet of wood as it is compressed.

Payment element applicator 48 may then attach one or more payment elements to at least one feature of the first set of features formed in the first sheet of wood (86). The one or more payment elements may include at least an antenna element. For example, the antenna element may be attached to the first antenna feature formed in the first densified sheet of wood. In some examples, an IC, a magnetic stripe, or both may also be attached to a feature of the first densified sheet of wood.

The example operation of FIG. 6 optionally includes selecting a second type of wood and cutting the wood to a second sheet of wood to a desired size. Similar to the first sheet of wood, the second sheet of wood may be thinner than sheet of wood 58 of the example of FIGS. 5A-5K. The example operation of FIG. 6 further includes boiling the second sheet of wood in a chemical solution (88). The boiled second sheet of wood may be compressed to form a second set of features in the second sheet of wood (90) and simultaneously heated (92). The second set of features may include at least a second antenna feature. In this way, the first and second sheets of wood may form a pocket for an antenna element when attached together. In some examples, the second set of features may optionally include one or more of a magnetic stripe feature, an IC feature, an account number, a user's name, an expiration date, a logo, a pattern, a demarcation, and/or an outline of the one or more transaction instruments. In other examples, one or more of the magnetic stripe feature, the IC feature, the account number, the user's name, the expiration date, the logo, the pattern, the demarcations, and/or the outline of the one or more transaction instruments may be added in a different manner (e.g., using an additional custom die, printed, or the like) or may not be included on the second sheet of wood. A second custom die in press 42 may be used to compress the second sheet of wood.

In some examples, feature elements of the first and/or second custom dies configured to form one or more features in the first and/or second densified sheets of wood as permanent indentations may enable one or more payment elements to be attached to the transaction instruments, enable customization of the transaction instruments, reduce time, reduce cost, reduce a number of steps associated with manufacturing the densified wood transaction instruments described herein, or the like. As one example, manufacturing the densified wood transaction instruments may not require an additional milling (or another cutting step) to remove material and form the features for payment elements in the densified sheets of wood.

In some examples, payment element applicator 48 may optionally attach one or more payment elements to a feature of the second set of features formed in the second sheet of wood. In some such examples, an IC, a magnetic stripe, and/or an antenna element may be attached to a feature of the second densified sheet of wood. In some cases, an antenna element may not be attached to the second densified sheet of wood, as once the first densified sheet of wood and the second densified sheet of wood are attached, the antenna element attached to the first densified sheet of wood may be contained between the first and second densified sheets of wood.

The example operation of FIG. 6 further includes attaching the first densified sheet of wood to the second densified sheet of wood to form a sheet of one or more densified wood transaction instruments (94). In some examples, the first densified sheet of wood and the second densified sheet of wood may be attached such that the first antenna feature on the first sheet of densified wood aligns with the second antenna feature on the second sheet of densified wood to form a sheet of one or more densified wood transaction instruments. In some examples, the antenna element may also be attached to the second antenna feature (e.g., using an adhesive). In other examples, the antenna element may be configured to be within a pocket defined by the alignment of the first and second antenna features without the use of an adhesive. In some examples, an adhesive may be used to attach the first and second densified sheets of wood.

In some examples, trimming device 54 may trim one or more transaction instruments from the sheet of the one or more densified wood transaction instruments. In some such examples, the one or more transaction instruments may be trimmed from the sheet of the one or more densified wood transaction instruments such that each transaction instrument of the one or more densified wood transaction instruments includes an antenna element between the first sheet of densified wood and the second sheet of densified wood.

Figure 7A:
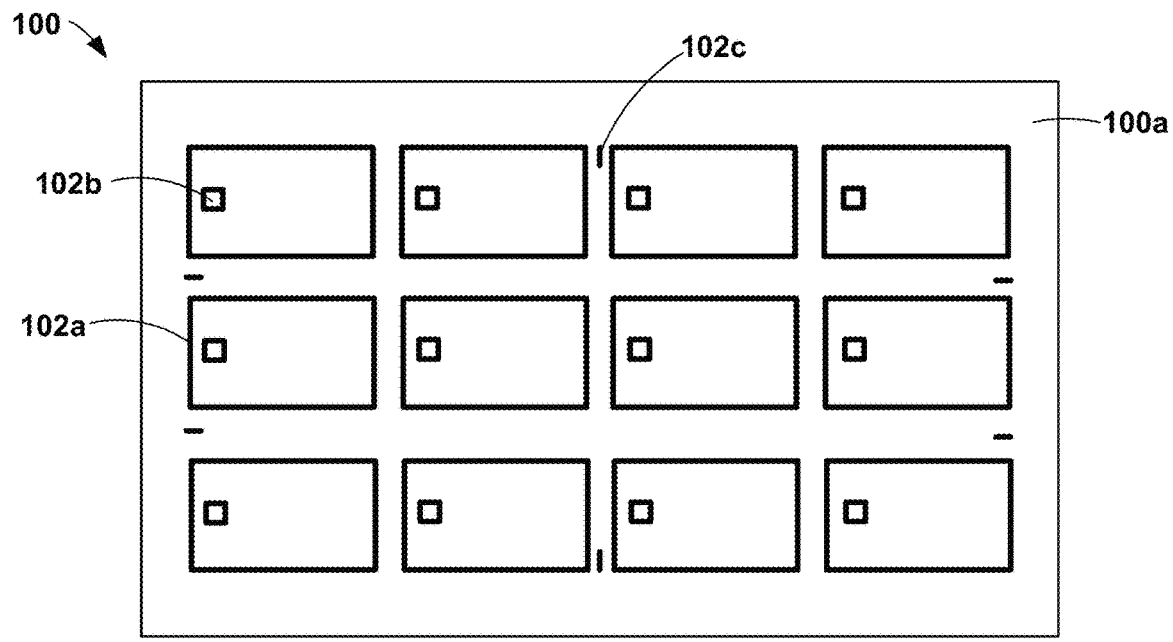
FIGS. 7A-7N are conceptual diagrams illustrating stages of the example operation for manufacturing one or more densified wood transaction instruments of FIG. 6, in accordance with the techniques of the disclosure.
Figure 7B:
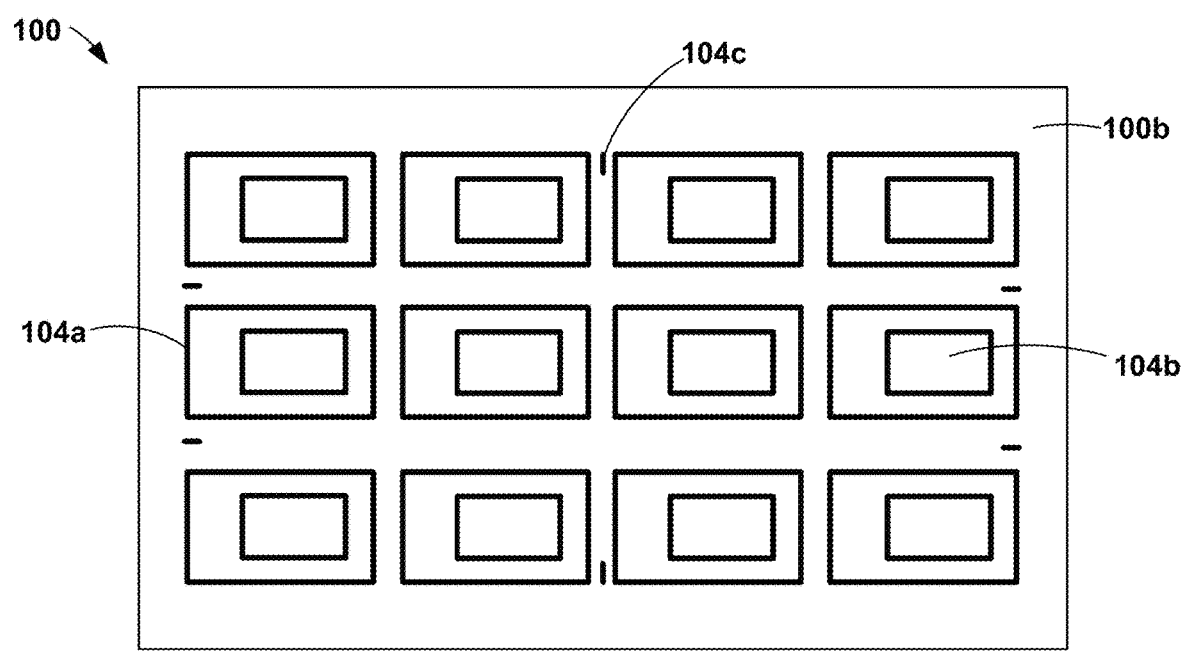
Figure 7C:
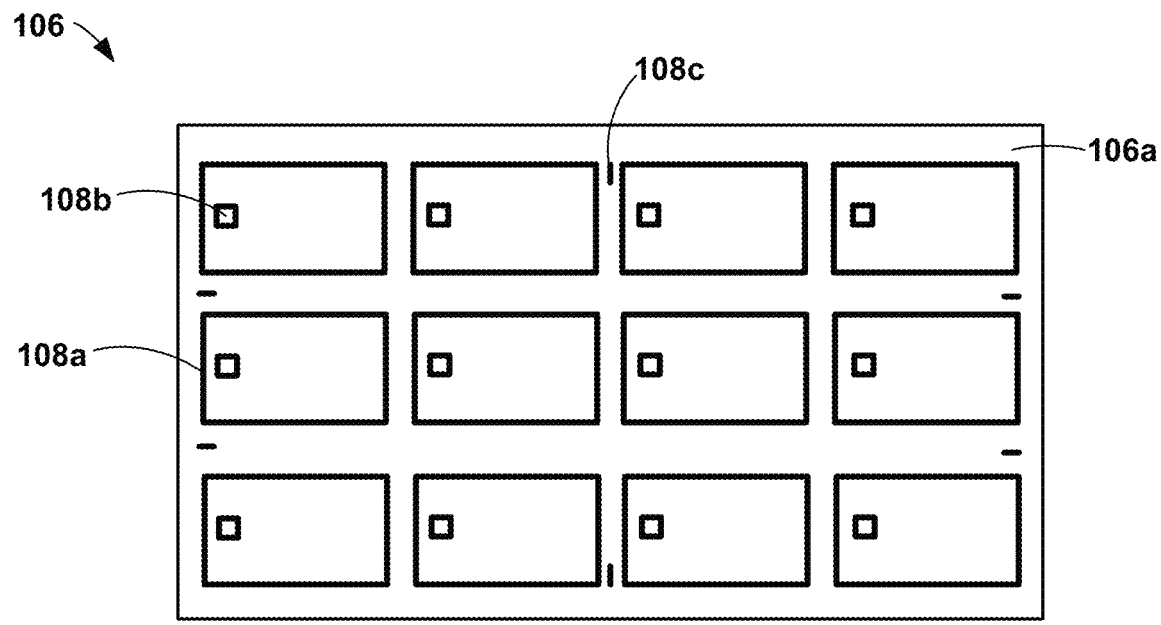
Figure 7D:
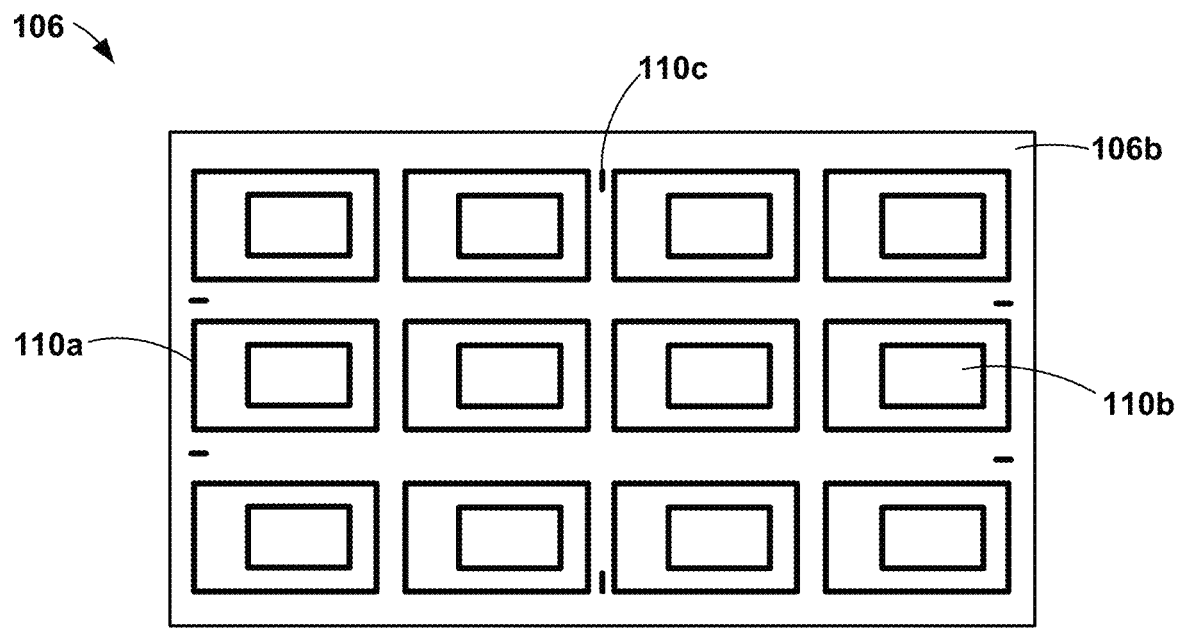
Figure 7E:
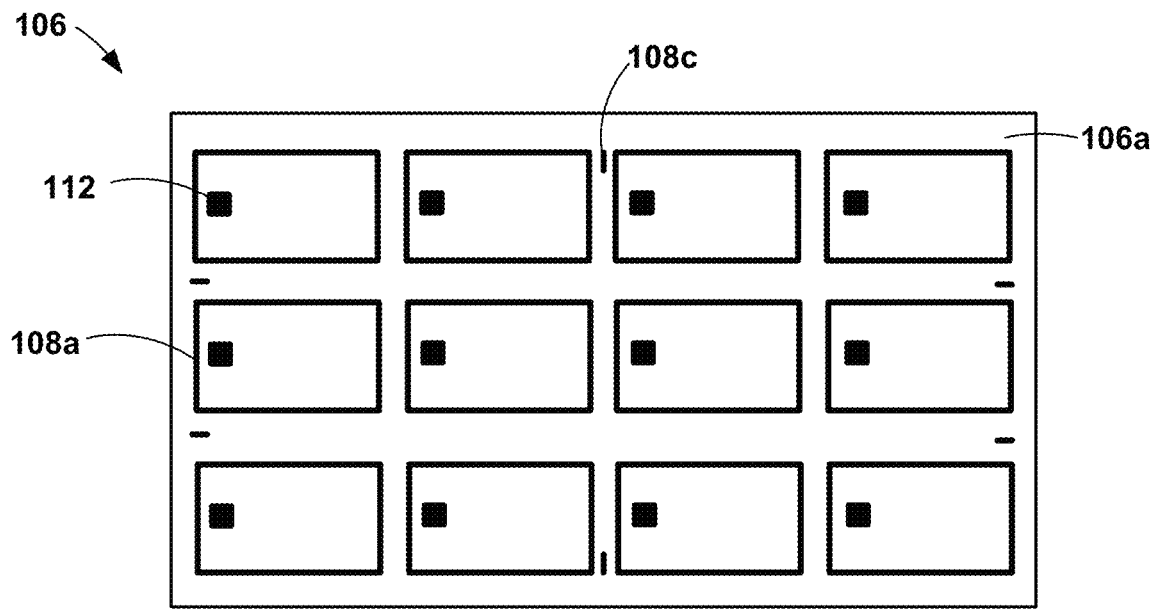
Figure 7F:
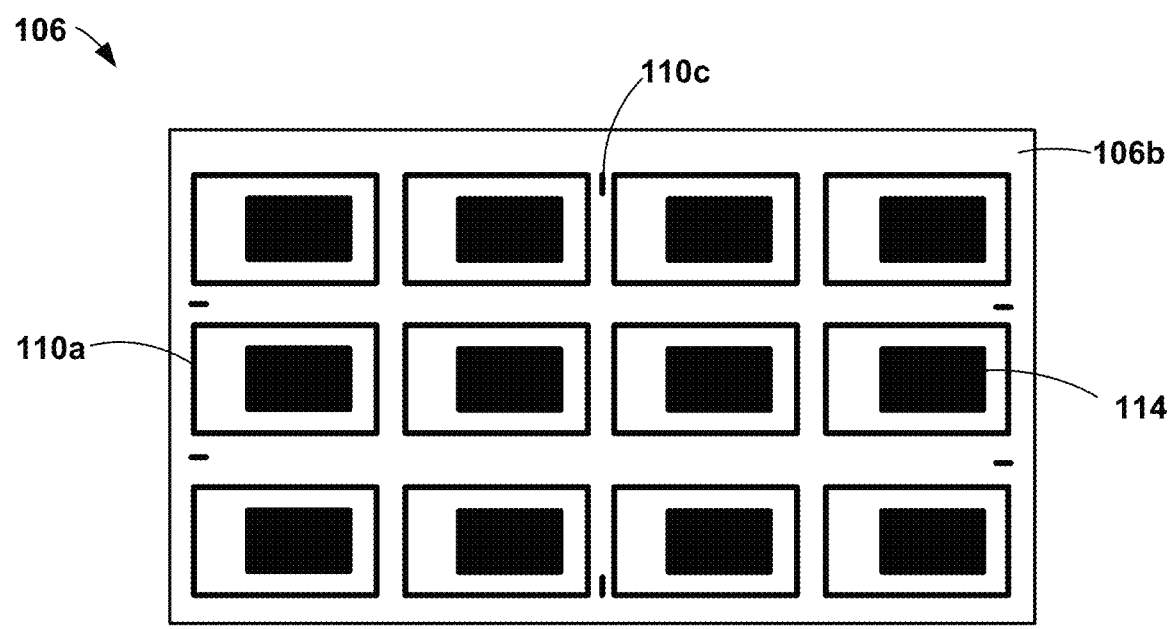
Figure 7G:
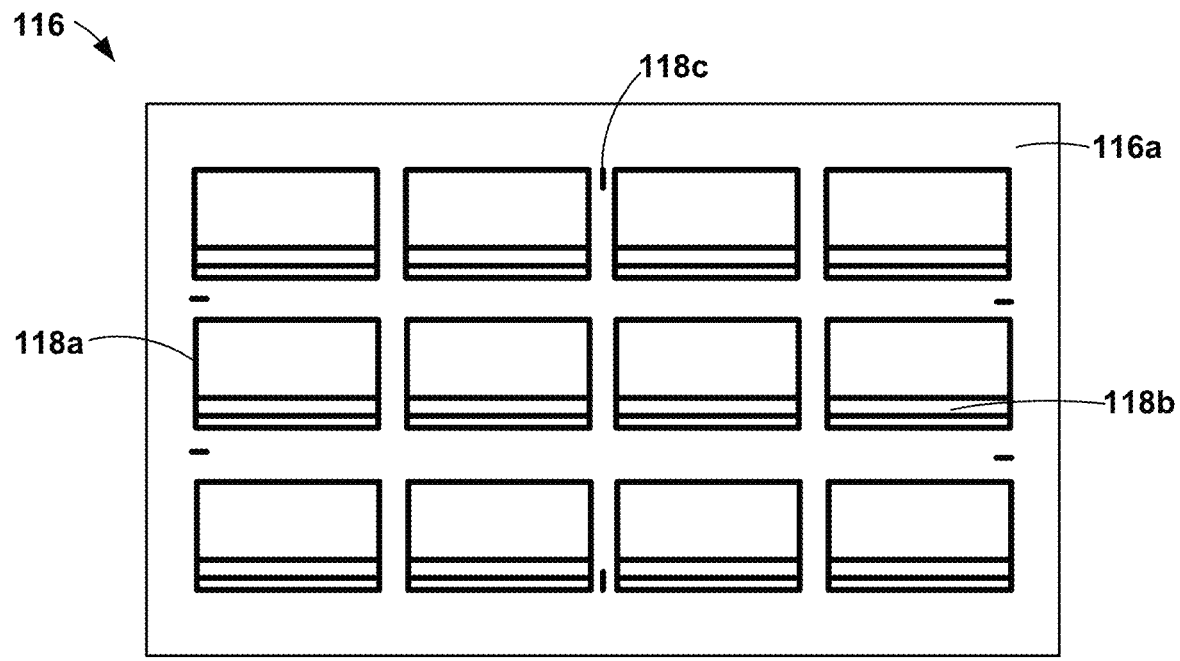
Figure 7H:
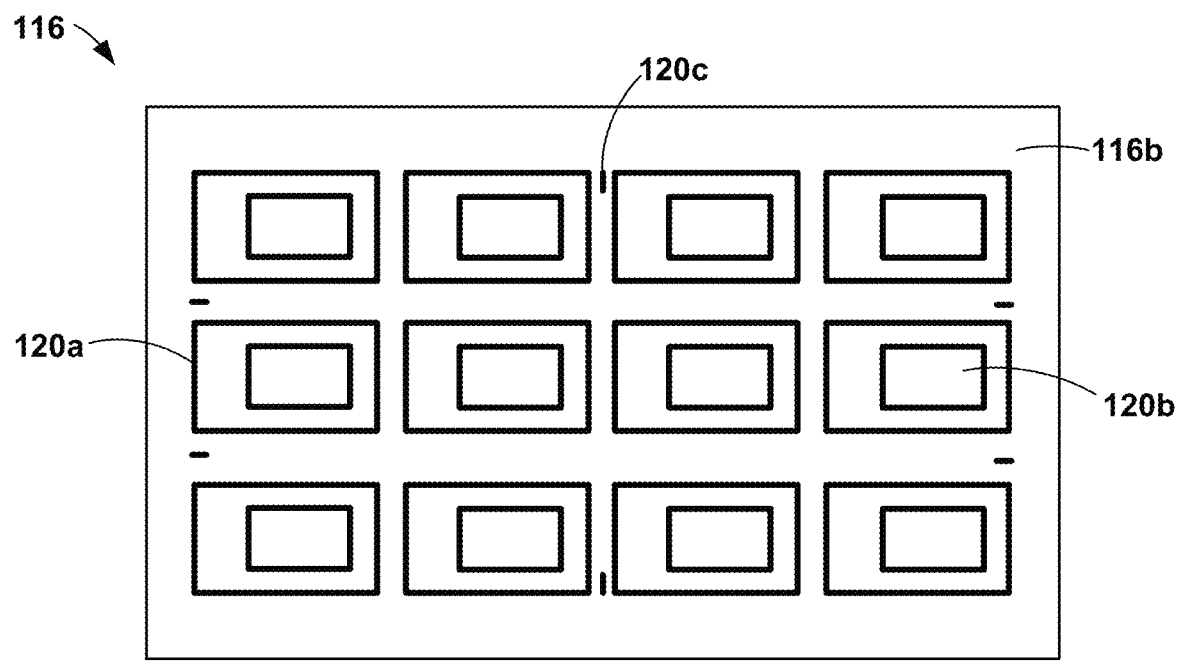
Figure 7I:
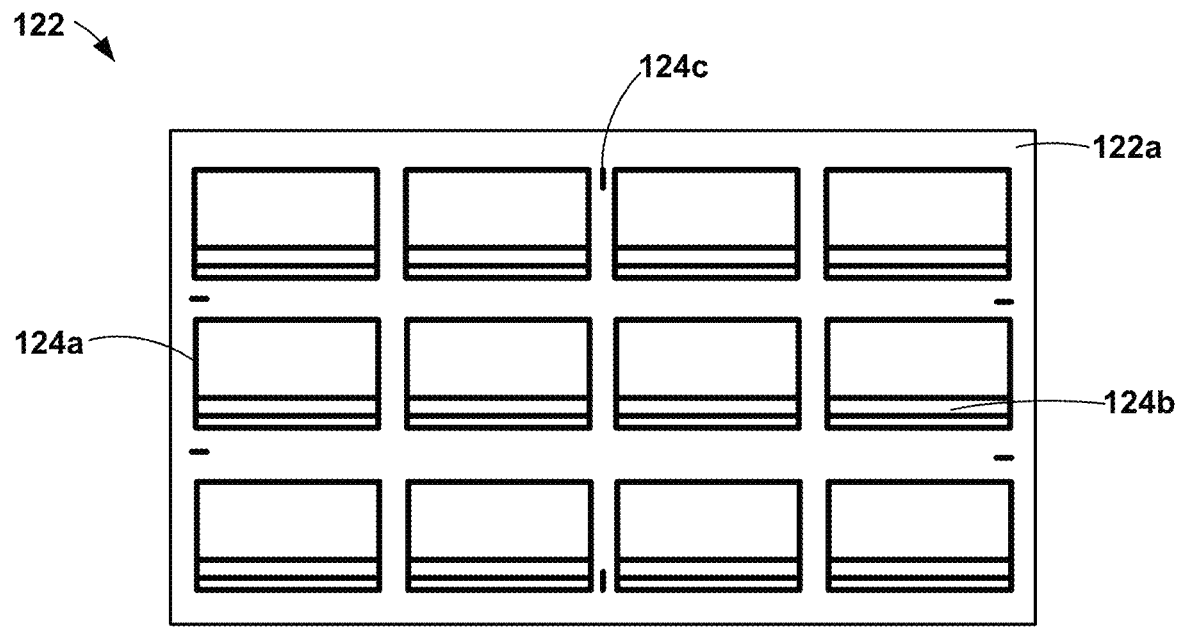
Figure 7J:
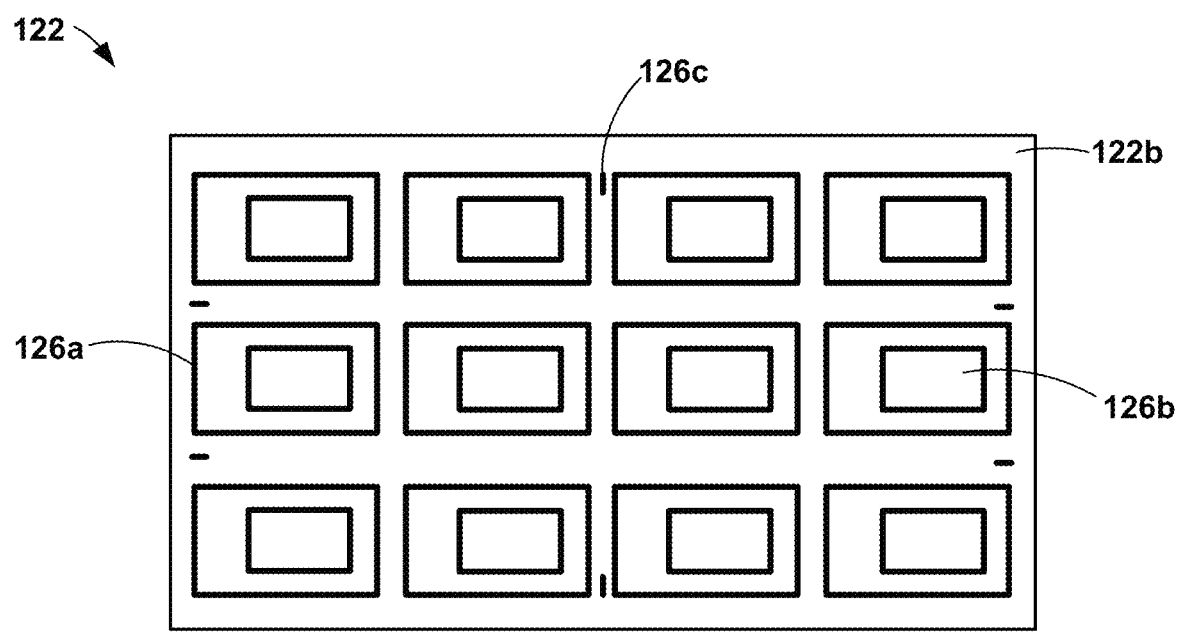
Figure 7K:
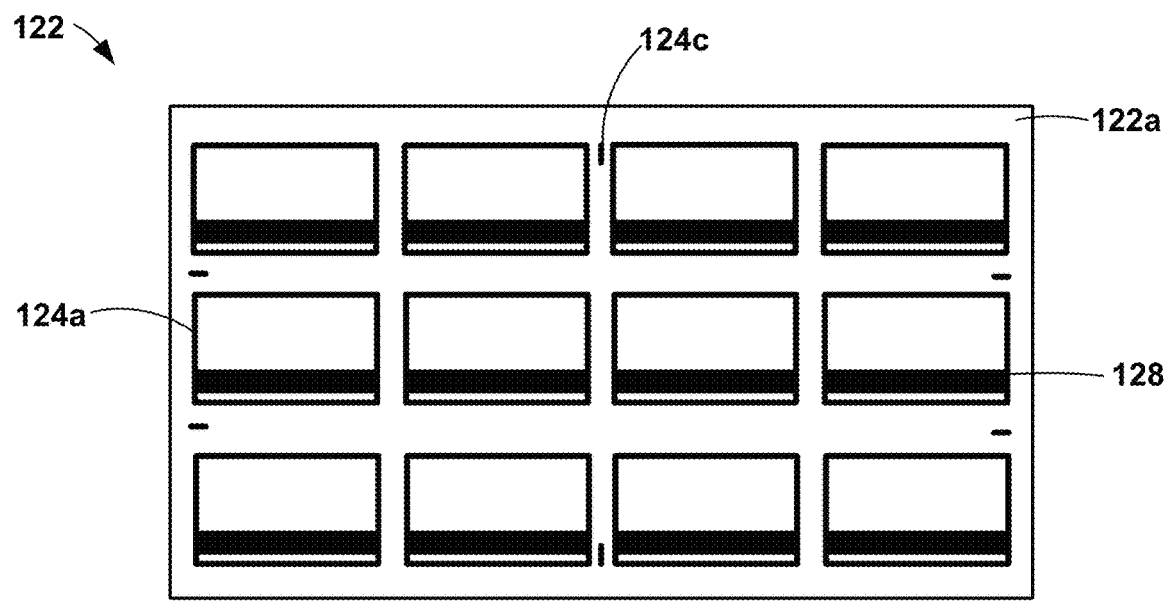
Figure 7L:
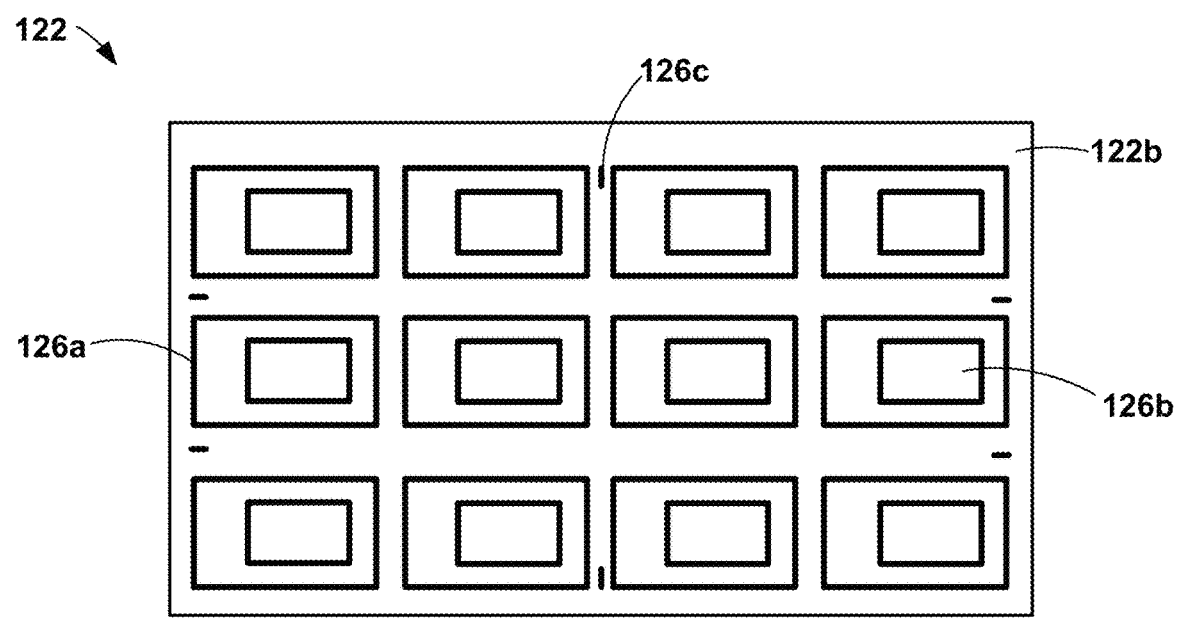
Figure 7M:
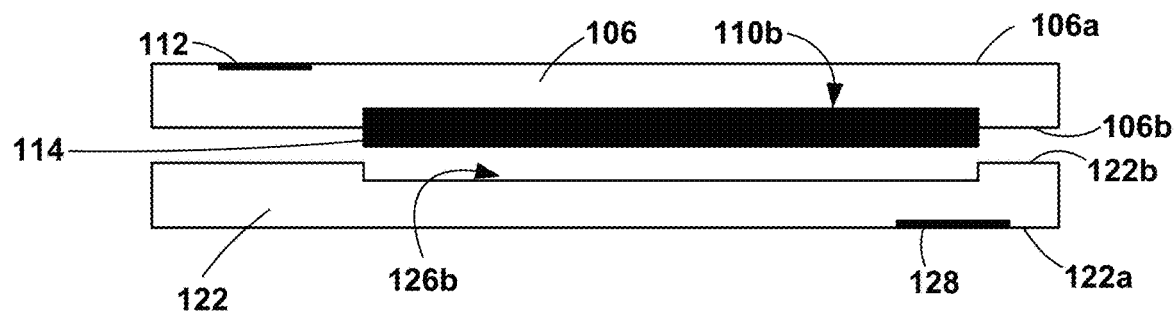
Figure 7N:
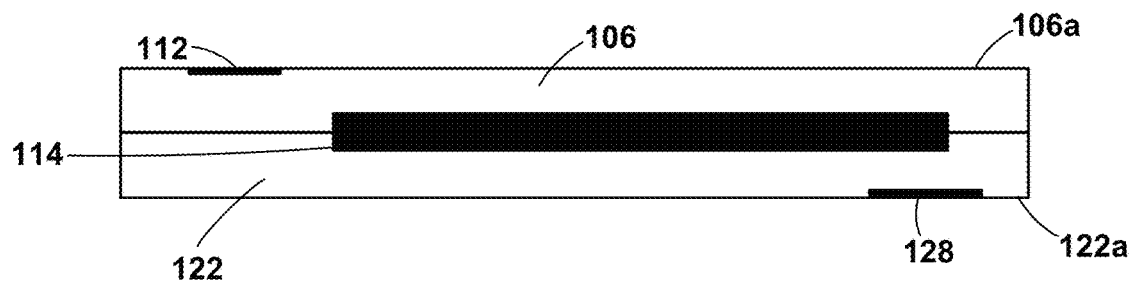

FIGS. 7A-7N are conceptual diagrams illustrating stages of the example operation of FIG. 6. FIGS. 7A and 7B illustrate the first custom die 100 to be used in press 42 to form the first set of features in the first sheet of wood. Specifically, FIG. 7A shows a first upper die plate 100*a* configured to form one or more features in a first side of the first sheet of wood, and FIG. 7B shows a first lower die plate 100*b* configured to form one or more features in a second side of the first sheet of wood. Because two layers of densified wood are used to form one or more transaction instruments using the example operation of FIG. 6, the first side of the first sheet of wood may define a first exterior side of the one or more transaction instruments, and the second side of the first sheet of wood may define a first interior side of the one or more transaction instruments (e.g., the side configured to be attached to a second sheet of densified wood).

First upper die plate 100*a* may be substantially similar to upper die plate 44*a* of FIG. 5D. First upper die plate 100*a* includes feature elements 102*a*-102*c* (collectively, "feature elements 102") configured to form card blank outlines 102*a*, IC features 102*b*, and demarcations 102*c*. In some examples, first upper die plate 100*a* may include additional or alternative feature elements 102. For example, in some cases, first upper die plate 100*a* may include account numbers, user's names, and/or expiration dates. First lower die plate 100*b* includes feature elements 104*a*-104*c* (collectively, "feature elements 104") configured to form card blank outlines 104*a*, first antenna features 104*b*, and demarcations 104*c*. Feature elements 102, 104 of first upper die plate 100*a* and first lower die plate 100*b*, respectively, may include embossed feature elements 102, 104 configured to form the first set of features as permanent indentations in the first sheet of densified wood as a result of compressing the first boiled sheet of wood using first die 100 in press 42. In other examples, only one of first upper die plate 100*a* or first lower die plate 100*b* may be used in press 42 at a time, or one of first upper die plate 100*a* or first lower die plate 100*b* may not include one or more of embossed feature elements 102, 104.

As described with respect to the example operation of FIG. 4, feature elements 102, 104 configured to form one or more features in the densified sheet of wood as permanent indentations may enable one or more payment elements to be attached to the transaction instruments, customization of the transaction instruments, or the like. Moreover, using feature elements 102, 104 to form features in the first sheet of wood during compression and heating of the first sheet of wood, may reduce time, cost, and a number of steps associated with manufacturing the densified wood transaction instruments described herein. For example, manufacturing the densified wood transaction instruments may not require an additional milling (or another cutting step) to remove material and form the features in the first sheet of wood for attachment of one or more payment elements.

FIGS. 7C and 7D illustrate a first densified sheet of wood 106 including the one or more features that include at least the first antenna feature 110*b* formed from heating and compressing the first sheet of wood in custom die 100 using press 46. In the example of FIG. 7C, first exterior side 106*a* of first densified sheet of wood 106 includes features 108*a*-108*c* (collectively, "features 108") that include card blank outlines 108*a*, IC features 108*b*, and demarcations 108*c*. In the example of FIG. 7D, first interior side 106*b* of first densified sheet of wood 106 includes features 110*a*-110*c* (collectively, "features 110") including card blank outlines 110*a*, first antenna features 110*b*, and demarcations 110*c*. Features 108, 110, such as, for example, IC features 108*b* and first antenna features 110*b*, may be permanent indentations on first densified sheet of wood 106.

Payment element applicator 48 may then attach one or more payment elements 112, 114 to at least one feature of the first set of features 108, 110 formed in the first sheet of wood 106 (86). The one or more payment elements may include at least an antenna element 114. For example, the antenna element may be attached to the first antenna feature 110*b* of first interior side 106*b* of first densified sheet of wood 106. In some examples, an IC 112, a magnetic stripe, or both may also be attached to a feature 108, 110 of first densified sheet of wood 106. In the example of FIGS. 7E and 7F, IC 112 is attached to first exterior side 106*a* of first densified sheet of wood 106.

FIGS. 7G and 7H illustrate the second custom die 116 that may be used in press 42 to form the second set of features in the second sheet of wood. FIG. 7G illustrates a second upper die plate 116*a* configured to form one or more features in a first side of the second sheet of wood, and FIG. 7H shows a second lower die plate 116*b* configured to form one or more features in a second side of the second sheet of wood. The first side of the second sheet of wood may define a second exterior side of the one or more transaction instruments, and the second side of the second sheet of wood may define a second interior side of the one or more transaction instruments (e.g., the side configured to be attached to the first sheet of wood).

Second upper die plate 116*a* may be the same or substantially the same as lower die plate 44*b* of FIG. 5E. For example, second upper die plate 116*a* includes feature elements 118*a*-118*c* (collectively, "feature elements 118") configured to form card blank outlines 118*a*, magnetic stripe features 118*b*, and demarcations 118*c*. Second lower die plate 116*b* includes feature elements 120*a*-120*c* (collectively, "feature elements 120") configured to form card blank outlines 120*a*, second antenna features 120*b*, and demarcations 120*c*. In this way, first lower die plate 100*b* and second lower die plate 116*b* may be the same or substantially the same. Feature elements 118, 120 may include embossed feature elements 118, 120 configured to form the second set of features as permanent indentations in the second sheet of densified wood by compressing the second boiled sheet of wood using second custom die 116 in press 46. In other examples, only one of second upper die plate 116*a* or second lower die plate 116*b* may be used in press 42 at a time, or one of second upper die plate 116*a* or second lower die plate 116*b* may not include embossed feature elements 118, 120. Moreover, in some examples, second upper die plate 116*a* and/or second lower die plate 116*b* may have additional or alternative features 118, 120, or second upper die plate 116*a* and/or second lower die plate 116*b* may not include all of features 118*a*-118*a*, 120*a*-120*c*.

FIGS. 7I and 7J illustrate a second densified sheet of wood 122 including the one or more features that include at least the second antenna feature 126*b* formed from heating and compressing the second sheet of wood in second custom die 116 using press 42. In the example of FIG. 7I, second exterior side 122*a* of second densified sheet of wood 122 includes features 124*a*-124*c* (collectively, "features 124") that include card blank outlines 124*a*, magnetic stripe features 124*b*, and demarcations 124*c*. In the example of FIG. 7J, second interior side 122*b* of second densified sheet of wood 122 includes features 126*a*-126*c* (collectively, "features 126") including card blank outlines 126*a*, second antenna features 126*b*, and demarcations 126*c*. Features 124, 126, such as, for example, magnetic stripe feature 124*b*, may be indentations on second densified sheet of wood 122.

In some examples, payment element applicator 48 may then optionally attach one or more payment elements 112, 114 to a feature of the second set of features 124, 126 formed in the second sheet of wood 122. In some such examples, an IC, a magnetic stripe 128, and/or an antenna element may be attached to a feature 124, 126 of second densified sheet of wood 122. In the example of FIG. 7K, magnetic stripe 128 is attached to second exterior side 122*a* of second densified sheet of wood 122. In some cases, an antenna element may not be attached to second interior side 122*b* of second densified sheet of wood 122. For example, once first densified sheet of wood 106 and second densified sheet of wood 122 are attached, antenna element 114 may be contained between first and second densified sheets of wood 106, 122. In other examples, a second antenna feature may be attached to second densified sheet of wood 122.

FIG. 7M illustrates an enlarged cross-sectional view of first densified sheet of wood 106 and second densified sheet of wood 122 being attached to each other such that the first antenna feature 110*b* on first sheet of densified wood 106 aligns with second antenna feature 126*b* on second sheet of densified wood 122. In other words, first densified sheet of wood 106 and second densified sheet of wood 122 may be attached at first and second interior sides 106*b* and 122*b* of first densified sheet of wood 106 and second densified sheet of wood 122, respectively. In some examples, antenna element 114 may also be attached to second antenna feature 126*b* (e.g., using an adhesive). In other examples, antenna element 114 may be configured to be within a pocket defined by the alignment of first and second antenna features 110*b*, 126*b* without the use of an adhesive. In some examples, an adhesive may be used to attach first and second interior sides 106*b*, 122*b* of the first and second densified sheets of wood 106, 122.

FIG. 7N illustrates an enlarged cross-sectional view of a transaction instrument of the one or more densified wood transaction instruments including antenna element 114 between first sheet of densified wood 106 and second sheet of densified wood 122. In some examples, one or more of the densified wood transaction instruments may be customized before or after being trimmed by trimming device 54. For example, a user's name, an account number, or an expiration date may be added to each transaction instrument. In some examples, a custom die, such as custom die 100, custom die 116, or another die may be used to add the customization to the transaction instruments. In other example, the customization may be added to the transaction instruments by printing, charring, branding, or by any other suitable manner.

Various examples have been described. These and other examples are within the scope of the following claims.

What is claimed is:
1. A method of manufacturing a densified wood transaction instrument, comprising:
  boiling a first sheet of wood in a chemical solution;
  compressing the first boiled sheet of wood using a first die in a press to form a first set of features in the first sheet of wood, wherein the first set of features comprises at least a first antenna feature formed on a first interior side of the first sheet of wood;
  during the compressing of the first boiled sheet of wood, heating the first boiled sheet of wood to create a first sheet of densified wood;
  attaching one or more payment elements to at least one feature of the first set of features formed into the first sheet of densified wood, wherein attaching the one or more payment elements comprises at least attaching an antenna element to the first antenna feature on the first interior side of the first sheet of densified wood;
  boiling a second sheet of wood in the chemical solution;
  compressing the second boiled sheet of wood using a second die in the press to form a second set of features in the second sheet of wood, wherein the second set of features comprises at least a second antenna feature formed on a second interior side of the second sheet of wood;

during compressing of the second boiled sheet of wood, heating the second boiled sheet of wood to create a second sheet of densified wood;

attaching the first sheet of densified wood to the second sheet of densified wood such that the antenna element is within a pocket defined by alignment of the first antenna feature on the first interior side of the first sheet of densified wood with the second antenna feature on the second interior side of the second sheet of densified wood to form a sheet of one or more densified wood transaction instruments;

determining a wood grain pattern of each transaction instrument of the one or more densified wood transaction instruments; and creating an authentication factor for each transaction instrument based on the wood grain pattern.

2. The method of claim 1,
wherein the first die comprises a first plate comprising a first set of embossed feature elements configured to form the first set of features as permanent indentations in the first sheet of densified wood as a result of compressing the first boiled sheet of wood using the first die in the press; and wherein the second die comprises a second plate comprising a second set of embossed feature elements configured to form the second set of features as permanent indentations in the second sheet of densified wood as a result of compressing the second boiled sheet of wood using the second die in the press.

3. The method of claim 1, wherein the first set of features formed into the first sheet of densified wood further comprises a magnetic stripe feature.

4. The method of claim 3, wherein attaching the one or more payment elements comprises attaching a magnetic stripe to the magnetic stripe feature formed into the first sheet of densified wood.

5. The method of claim 1, wherein the first set of features formed into the first sheet of densified wood further comprises an integrated circuit (IC) feature.

6. The method of claim 5, wherein attaching the one or more payment elements comprises attaching an IC to the IC feature formed into the first sheet of densified wood.

7. The method of claim 1, wherein the first set of features formed into the first sheet of densified wood further comprises at least one of an account number, a user's name, an expiration date, a logo, a pattern, a demarcation, or an outline of the one or more densified wood transaction instruments.

8. The method of claim 1, wherein the second set of features formed into the second sheet of densified wood further comprises at least one of an account number, a user's name, an expiration date, a logo, a pattern, a demarcation, or an outline of the one or more densified wood transaction instruments.

9. The method of claim 1, further comprising trimming, after attaching the first sheet of densified wood to the second sheet of densified wood, the one or more densified wood transaction instruments from the sheet of one or more densified wood transaction instruments, wherein each transaction instrument of the one or more densified wood transaction instruments includes the antenna element within the pocket between the first sheet of densified wood and the second sheet of densified wood.

10. The method of claim 1, further comprising customizing at least one transaction instrument of the one or more densified wood transaction instruments, wherein customizing the at least one transaction instrument comprises:

embedding an item in the at least one transaction instrument;

adding metal flake to the at least one transaction instrument;

staining the at least one transaction instrument;
charring the at least one transaction instrument;
branding the at least one transaction instrument;
laser marking the at least one transaction instrument;
impregnating the at least one transaction instrument with ink; or combinations thereof.

11. The method of claim 1, wherein:
the first die comprises a first upper die plate configured to form at least the first antenna feature on the first interior side of the first sheet of densified wood and a first lower die plate configured to form at least one additional feature on a first exterior side opposite of the first interior side of the first sheet of densified wood;

the second die comprises a second upper die plate configured to form at least the second antenna feature on the second interior side of the second sheet of densified wood and a second lower die plate configured to form at least one additional feature on a second exterior side opposite of the second interior side of the second sheet of densified wood;

compressing the first boiled sheet of wood comprises compressing the first boiled sheet of wood using the first upper die plate and the first lower die plate in the press to simultaneously form at least the first antenna feature on the first interior side of the first sheet of wood and the at least one additional feature on the first exterior side of the first sheet of wood;

compressing the second boiled sheet of wood comprises compressing the second boiled sheet of wood using the second upper die plate and the second lower die plate in the press to simultaneously form at least the second antenna feature on the second interior side of the second sheet of wood and the at least one additional feature on the second exterior side of the second sheet of wood; and attaching the first sheet of densified wood to the second sheet of densified wood comprises attaching the first interior side of the first sheet of densified wood to the second interior side of the second sheet of wood such that the antenna element is within the pocket defined by the alignment of the first and second antenna features to form the sheet of one or more densified wood transaction instruments.

12. A densified wood transaction instrument, comprising:
a densified wood card including a first sheet of densified wood and a second sheet of densified wood;

a first set of features formed into the first sheet of densified wood, wherein the first set of features comprises at least a first antenna feature formed on a first interior side of the first sheet of densified wood;

a second set of features formed into the second sheet of densified wood, wherein the second set of features comprises at least a second antenna feature formed on a second interior side of the second sheet of densified wood; and one or more payment elements attached to at least one feature of the first set of features or the second set of features, wherein the one or more payment elements comprise at least an antenna element attached to the first antenna feature on the first interior side of the first sheet of densified wood, wherein the first sheet of densified wood is attached to the second sheet of densified wood such that the antenna element is within a pocket defined by alignment of the first antenna feature on the first interior side of the first sheet of densified wood with the second antenna feature on the second interior side of the second sheet of densified wood, wherein the densified wood card is formed via a method of manufacturing comprising:

boiling a first sheet of wood in a chemical solution;

compressing the first boiled sheet of wood using a first die in a press to form the first set of features in the first sheet of wood;

during the compressing of the first boiled sheet of wood, heating the first boiled sheet of wood to create the first sheet of densified wood;

attaching the one or more payment elements to at least one feature of the first set of features formed into the first sheet of densified wood;

boiling a second sheet of wood in the chemical solution;

compressing the second boiled sheet of wood using a second die in the press to form the second set of features in the second sheet of wood;

during compressing of the second boiled sheet of wood, heating the second boiled sheet of wood to create the second sheet of densified wood; and attaching the first sheet of densified wood to the second sheet of densified wood, wherein the densified wood card further defines a wood grain pattern, wherein the wood grain pattern is associated with a hash value, and wherein the densified wood transaction instrument is authenticated for a transaction using an authentication factor based on the wood grain pattern and the hash value.

13. The densified wood transaction instrument of claim 12, wherein the first set of features formed into the first sheet of densified wood comprises at least the first antenna feature formed on the first interior side of the first sheet of densified wood and at least one additional feature formed on a first exterior side opposite of the first interior side of the first sheet of densified wood;

wherein the second set of features formed into the second sheet of densified wood comprises at least the second antenna feature formed on the second interior side of the second sheet of densified wood and at least one additional feature formed on a second exterior side opposite of the second interior side of the second sheet of densified wood; and wherein the first interior side of the first sheet of densified wood is attached to the second interior side of the second sheet of wood such that the antenna element is within the pocket defined by the alignment of the first and second antenna features.

14. The densified wood transaction instrument of claim 12, wherein the first set of features formed into the first sheet of densified wood further comprises a magnetic stripe feature, and wherein the one or more payment elements comprise a magnetic stripe attached to the magnetic stripe feature formed into the first sheet of densified wood.

15. The densified wood transaction instrument of claim 12, wherein the first set of features formed into the first sheet of densified wood further comprises an integrated circuit (IC) feature, and wherein the one or more payment elements comprise an IC attached to the IC feature formed into the first sheet of densified wood.

16. The densified wood transaction instrument of claim 12, wherein the first set of features formed into the first sheet of densified wood further comprises at least one of an account number, a user's name, an expiration date, a logo, a pattern, a demarcation, or an outline of the densified wood transaction instrument.

17. The densified wood transaction instrument of claim 12, wherein the second set of features formed into the second sheet of densified wood further comprises at least one of an account number, a user's name, an expiration date, a logo, a pattern, a demarcation, or an outline of the densified wood transaction instrument.

18. The densified wood transaction instrument of claim 12, wherein the densified wood transaction instrument is customized to include at least one of:

an item embedded in the transaction instrument;

metal flake added to the transaction instrument;

stain added to the transaction instrument;

one or more char marks added to the transaction instrument;

one or more branding marks added to the transaction instrument;

one or more laser marks added to the transaction instrument;

ink impregnated within the transaction instrument; or combinations thereof.

19. A method of manufacturing a densified wood transaction instrument, comprising:

boiling a first sheet of wood in a chemical solution;

compressing the first boiled sheet of wood using a first die in a press to form a first set of features in the first sheet of wood, wherein the first die comprises a first upper die plate configured to form at least a first antenna feature on a first interior side of the first sheet of wood and a first lower die plate configured to form at least one additional feature on a first exterior side opposite of the first interior side of the first sheet of wood, and wherein compressing the first boiled sheet of wood comprises compressing the first boiled sheet of wood using the first upper die plate and the first lower die plate in the press to simultaneously form at least the first antenna feature on the first interior side of the first sheet of wood and the at least one additional feature on the first exterior side of the first sheet of wood;

during the compressing of the first boiled sheet of wood, heating the first boiled sheet of wood to create a first sheet of densified wood;

attaching one or more payment elements to at least one feature of the first set of features formed into the first sheet of densified wood, wherein attaching the one or more payment elements comprises at least attaching an antenna element to the first antenna feature on the first interior side of the first sheet of densified wood;

boiling a second sheet of wood in the chemical solution;

compressing the second boiled sheet of wood using a second die in the press to form a second set of features in the second sheet of wood, wherein the second die comprises a second upper die plate configured to form at least a second antenna feature on a second interior side of the second sheet of wood and a second lower die plate configured to form at least one additional feature on a second exterior side opposite of the second interior side of the second sheet of wood, and wherein compressing the second boiled sheet of wood comprises compressing the second boiled sheet of wood using the second upper die plate and the second lower die plate in the press to simultaneously form at least the second antenna feature on the second interior side of the second sheet of wood and the at least one additional feature on the second exterior side of the second sheet of wood;

during compressing of the second boiled sheet of wood, heating the second boiled sheet of wood to create a second sheet of densified wood; and attaching the first interior side of the first sheet of densified wood to the second interior side of the second sheet of densified wood such that the antenna element is within a pocket defined by alignment of the first antenna feature on the first interior side of the first sheet of densified wood with the second antenna feature on the second interior side of the second sheet of densified wood to form a sheet of one or more densified wood transaction instruments.

20. A densified wood transaction instrument, comprising:

a densified wood card including a first sheet of densified wood and a second sheet of densified wood;

a first set of features formed into the first sheet of densified wood, wherein the first set of features comprises at least a first antenna feature formed on a first interior side of the first sheet of densified wood and at least one additional feature formed on a first exterior side opposite of the first interior side of the first sheet of densified wood;

a second set of features formed into the second sheet of densified wood, wherein the second set of features comprises at least a second antenna feature formed on a second interior side of the second sheet of densified wood and at least one additional feature formed on a second exterior side opposite of the second interior side of the second sheet of densified wood; and one or more payment elements attached to at least one feature of the first set of features or the second set of features, wherein the one or more payment elements comprise at least an antenna element attached to the first antenna feature on the first interior side of the first sheet of densified wood, wherein the first interior side of the first sheet of densified wood is attached to the second interior side of the second sheet of densified wood such that the antenna element is within a pocket defined by alignment of the first antenna feature on the first interior side of the first sheet of densified wood with the second antenna feature on the second interior side of the second sheet of densified wood, wherein the densified wood card is formed via a method of manufacturing comprising:

boiling a first sheet of wood in a chemical solution;

compressing the first boiled sheet of wood using a first die in a press to form the first set of features in the first sheet of wood;

during the compressing of the first boiled sheet of wood, heating the first boiled sheet of wood to create the first sheet of densified wood;

attaching the one or more payment elements to at least one feature of the first set of features formed into the first sheet of densified wood;

boiling a second sheet of wood in the chemical solution;

compressing the second boiled sheet of wood using a second die in the press to form the second set of features in the second sheet of wood;

during compressing of the second boiled sheet of wood, heating the second boiled sheet of wood to create the second sheet of densified wood; and attaching the first sheet of densified wood to the second sheet of densified wood.

* * * * *